(12) United States Patent
Honda et al.

(10) Patent No.: US 11,313,675 B2
(45) Date of Patent: Apr. 26, 2022

(54) THREAD SHAPE MEASURING APPARATUS AND MEASURING METHOD

(71) Applicant: NIPPON STEEL CORPORATION, Tokyo (JP)

(72) Inventors: Tatsuro Honda, Tokyo (JP); Shinichi Oshima, Tokyo (JP); Yoshito Isei, Tokyo (JP); Kenshiro Oie, Tokyo (JP); Takenori Kuramoto, Tokyo (JP); Takanori Tanaka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 59 days.

(21) Appl. No.: 16/981,667

(22) PCT Filed: Apr. 26, 2019

(86) PCT No.: PCT/JP2019/017883
§ 371 (c)(1),
(2) Date: Sep. 16, 2020

(87) PCT Pub. No.: WO2019/212042
PCT Pub. Date: Nov. 7, 2019

(65) Prior Publication Data
US 2021/0041228 A1 Feb. 11, 2021

(30) Foreign Application Priority Data
May 2, 2018 (JP) .............................. JP2018-088880

(51) Int. Cl.
*G01B 11/24* (2006.01)
*G06T 7/50* (2017.01)
(Continued)

(52) U.S. Cl.
CPC ...... *G01B 11/2425* (2013.01); *G01B 11/2433* (2013.01); *G01N 21/952* (2013.01);
(Continued)

(58) Field of Classification Search
CPC ............ G01B 11/2425; G01B 11/2433; G01N 21/952; G01N 2021/8887; G06T 7/50; G06T 2207/30136
See application file for complete search history.

(56) References Cited

U.S. PATENT DOCUMENTS 4,644,394 A * 2/1987 Reeves .............. G01B 11/2425
33/199 B
8,744,160 B2   6/2014 Bonadeo et al.
(Continued)

FOREIGN PATENT DOCUMENTS

JP          63191007 A      8/1988
JP          63212808 A      9/1988
(Continued)

*Primary Examiner* — Michael P LaPage
(74) *Attorney, Agent, or Firm* — Greer Burns & Crain Ltd.

(57) ABSTRACT

A thread shape measuring apparatus includes: a first illuminating unit that has an optical axis orthogonal to a cross section including a thread axis, and illuminates the thread portion; a second illuminating unit that has an optical axis that forms an angle θ larger than a lead angle γ of the thread portion with respect to the direction orthogonal to the cross section and illuminates the thread portion; an image-capturing unit that has a visual axis parallel to the optical axis of the first illuminating unit, includes a telecentric lens, has a focusing position matching the cross section, and detects, out of the light emitted from the first illuminating unit or the second illuminating unit, light that has not been blocked by the thread portion to capture an image of the detected light; and an operation unit that calculates a shape of the thread portion based on the captured image.

6 Claims, 24 Drawing Sheets

(51) Int. Cl.
*G01N 21/952* (2006.01)
*G01N 21/88* (2006.01)

(52) U.S. Cl.
CPC ........ *G06T 7/50* (2017.01); *G01N 2021/8887* (2013.01); *G06T 2207/30136* (2013.01)

(56) References Cited

U.S. PATENT DOCUMENTS

| | | | |
|---|---|---|---|
| 8,804,104 B2 | 8/2014 | Honda et al. | |
| 2005/0134838 A1* | 6/2005 | Hartmann | G01B 11/2425 356/237.1 |
| 2010/0182424 A1* | 7/2010 | Gschwendtner | G01B 11/2425 348/135 |
| 2011/0164244 A1 | 7/2011 | Honda et al. | |
| 2011/0293169 A1 | 12/2011 | Bonadeo et al. | |
| 2012/0268748 A1* | 10/2012 | Walstra | G01B 11/2433 356/614 |
| 2016/0018214 A1* | 1/2016 | Penhorwood | G01N 21/952 356/237.1 |
| 2018/0128601 A1* | 5/2018 | Yamaguchi | B23Q 17/2471 |
| 2019/0137264 A1* | 5/2019 | Sauerland | B25J 19/021 |

FOREIGN PATENT DOCUMENTS

| | | |
|---|---|---|
| JP | 3552440 B2 | 8/2004 |
| JP | 2010038554 A | 2/2010 |
| JP | 4486700 B2 | 6/2010 |
| JP | 2016075502 A | 5/2016 |
| JP | 5952269 B2 | 7/2016 |
| JP | 2017190980 A | 10/2017 |

\* cited by examiner

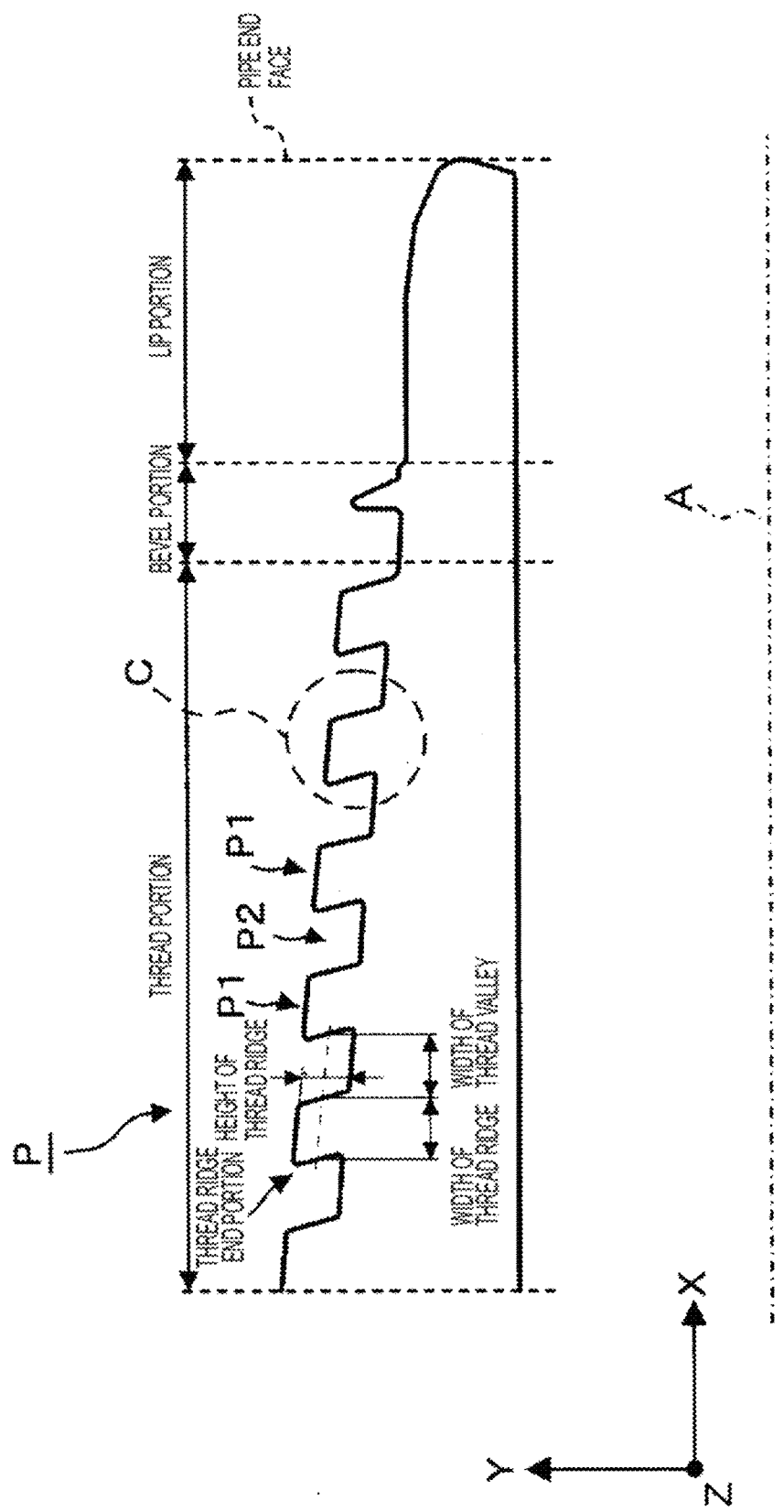

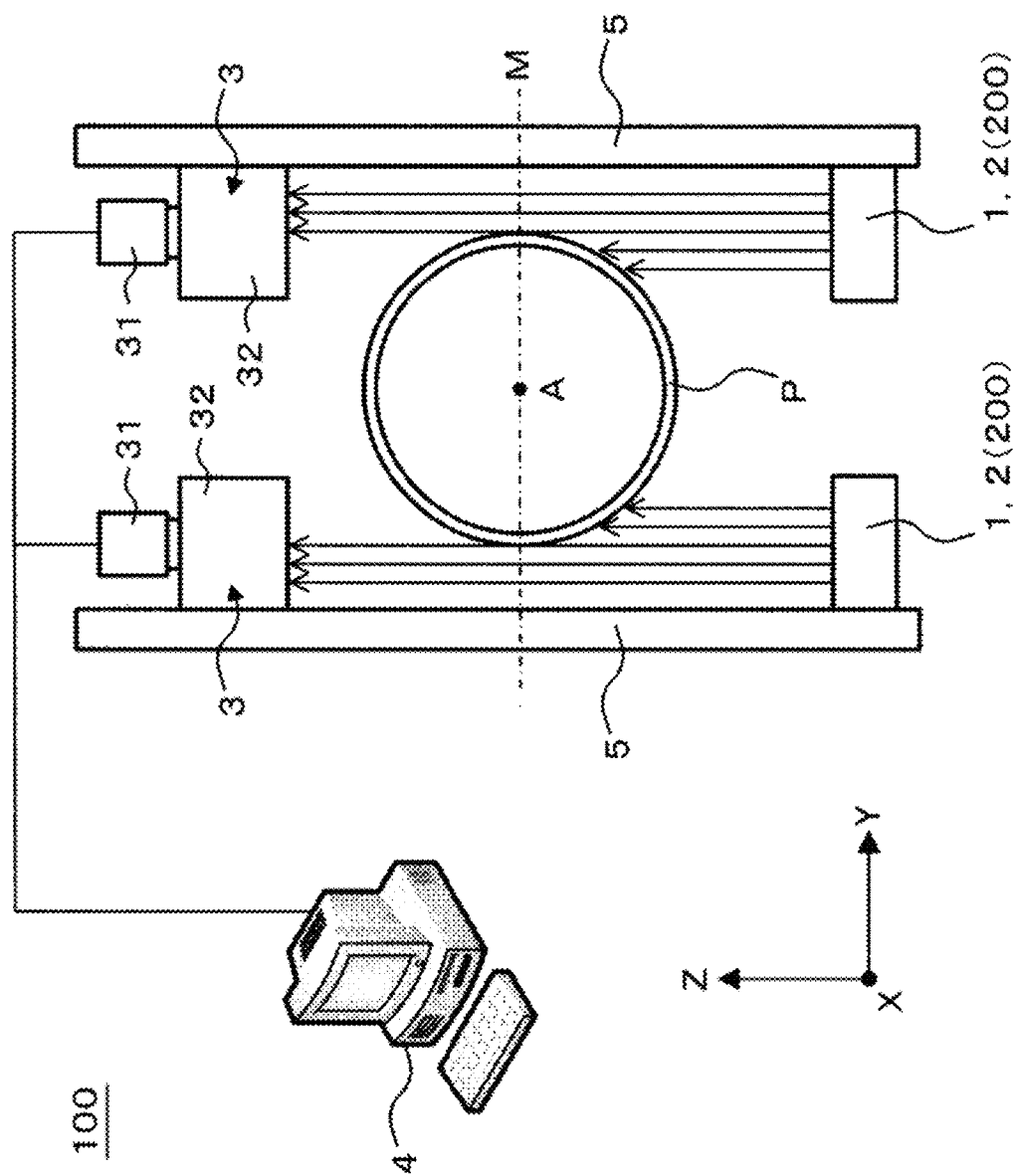

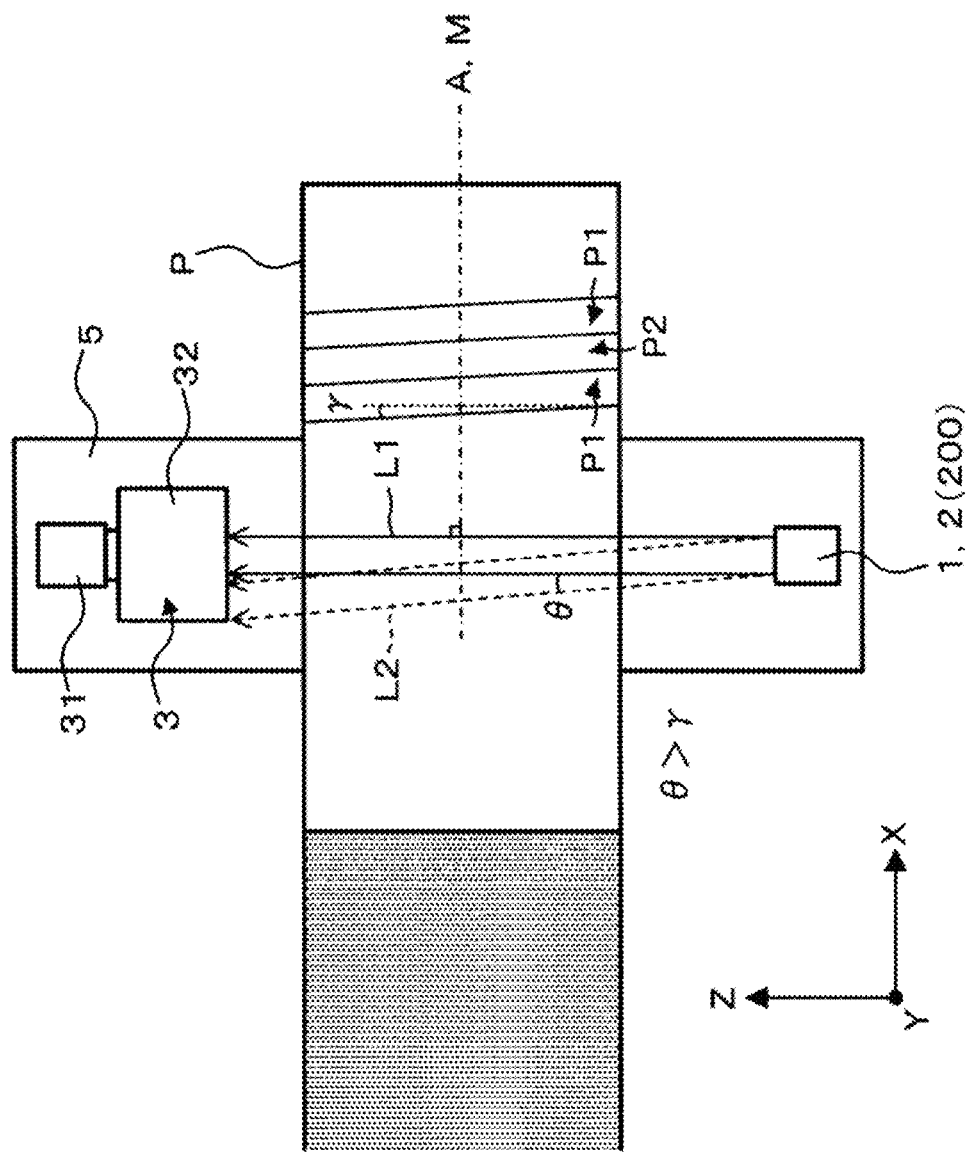

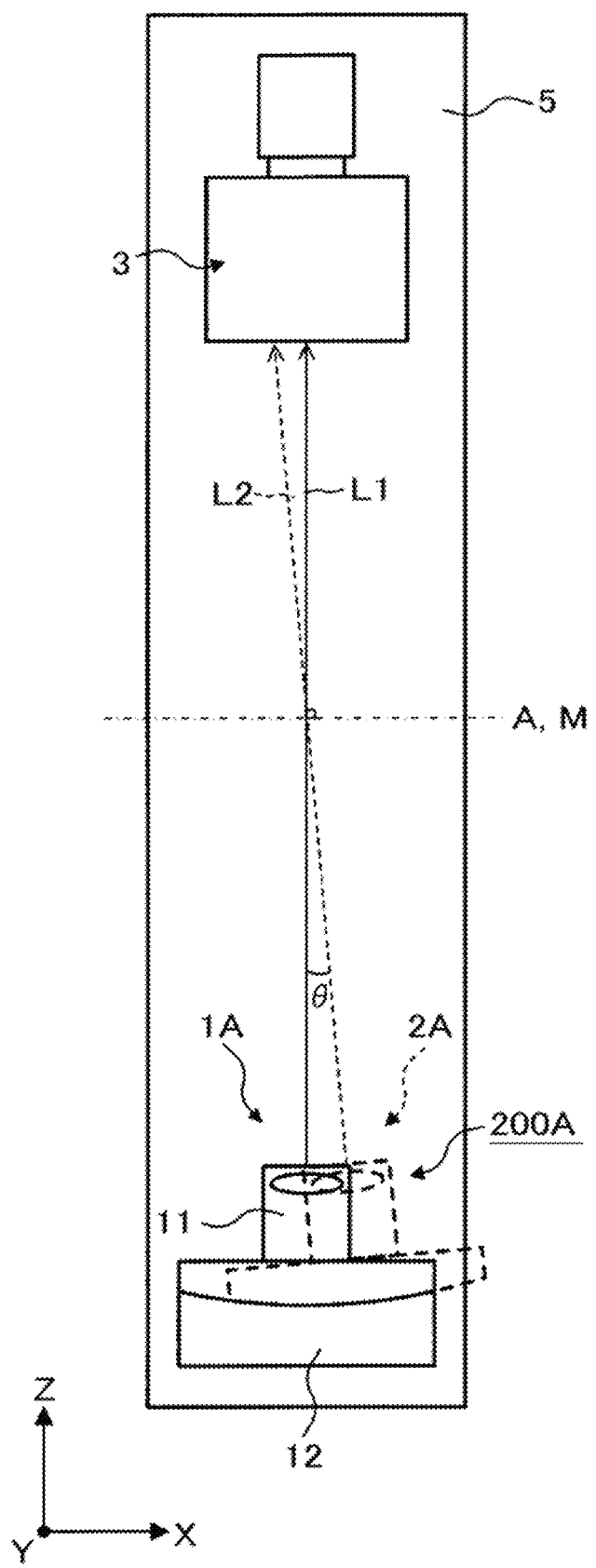

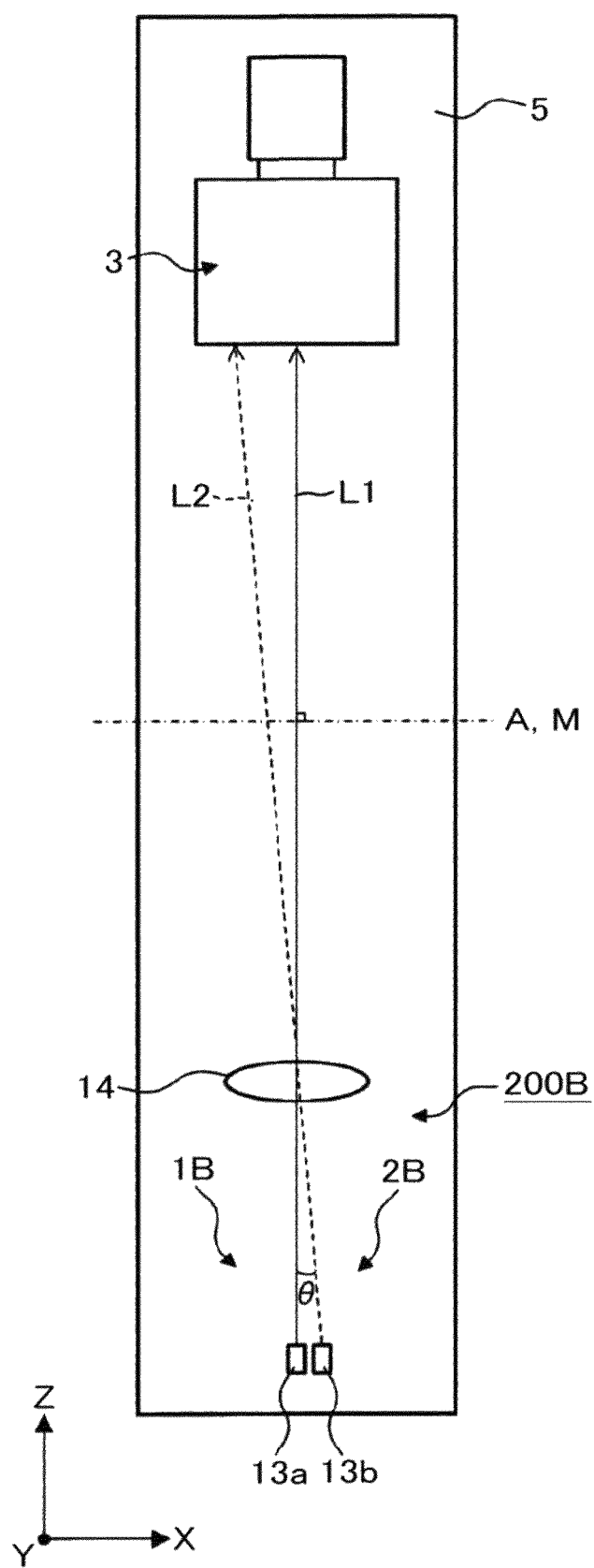

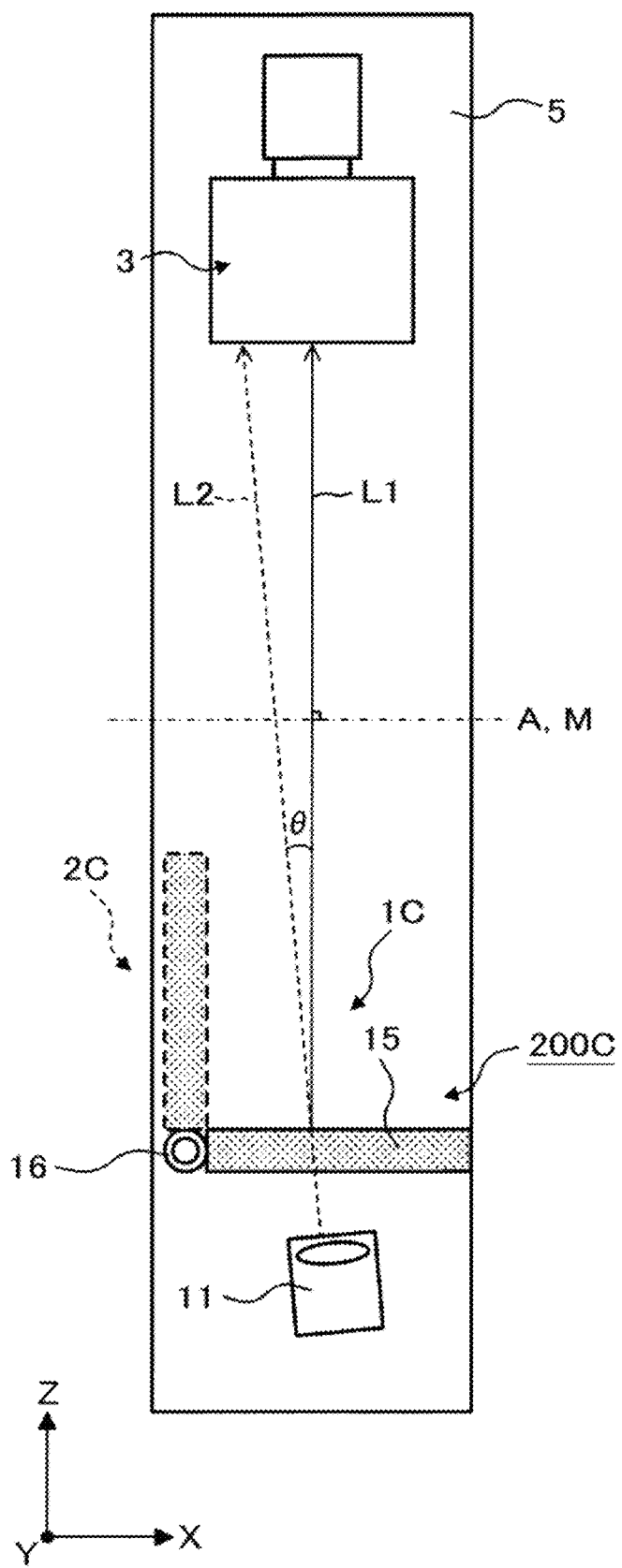

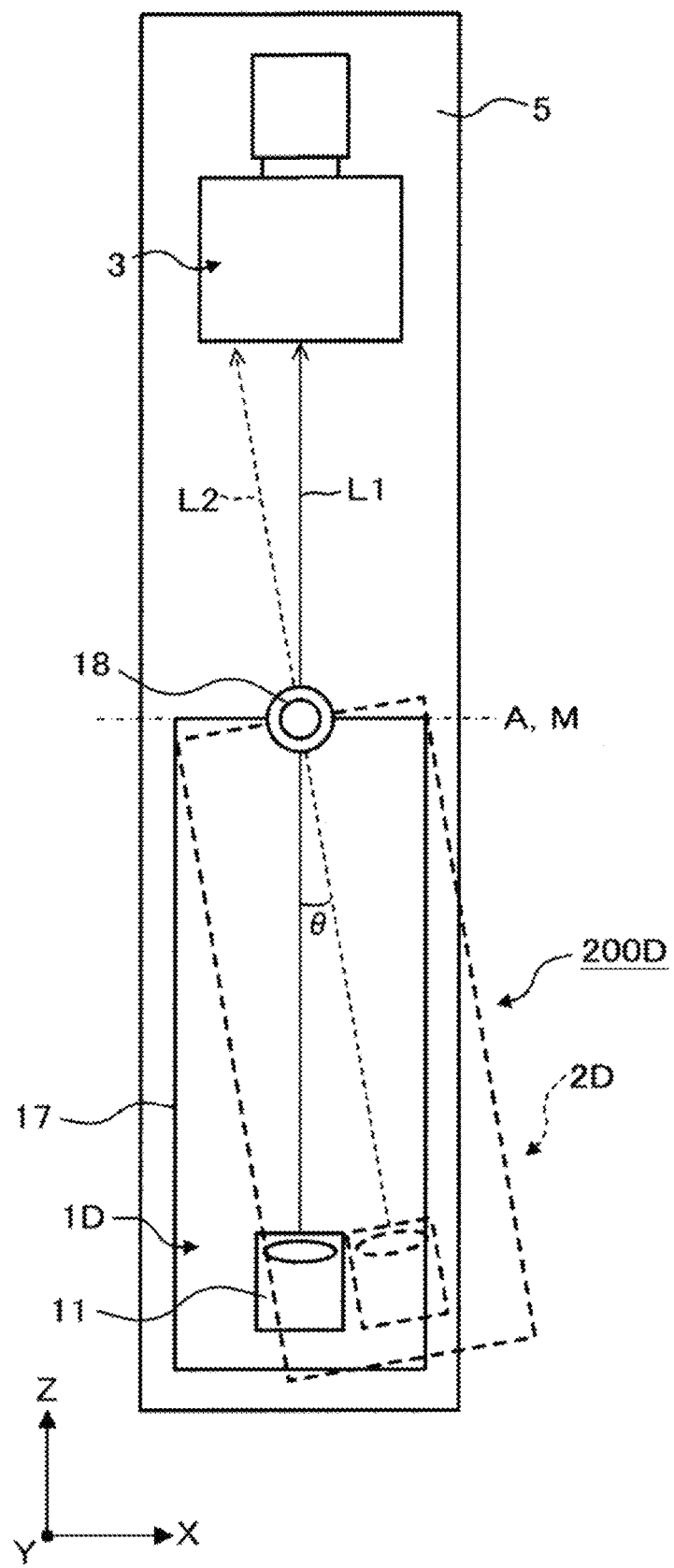

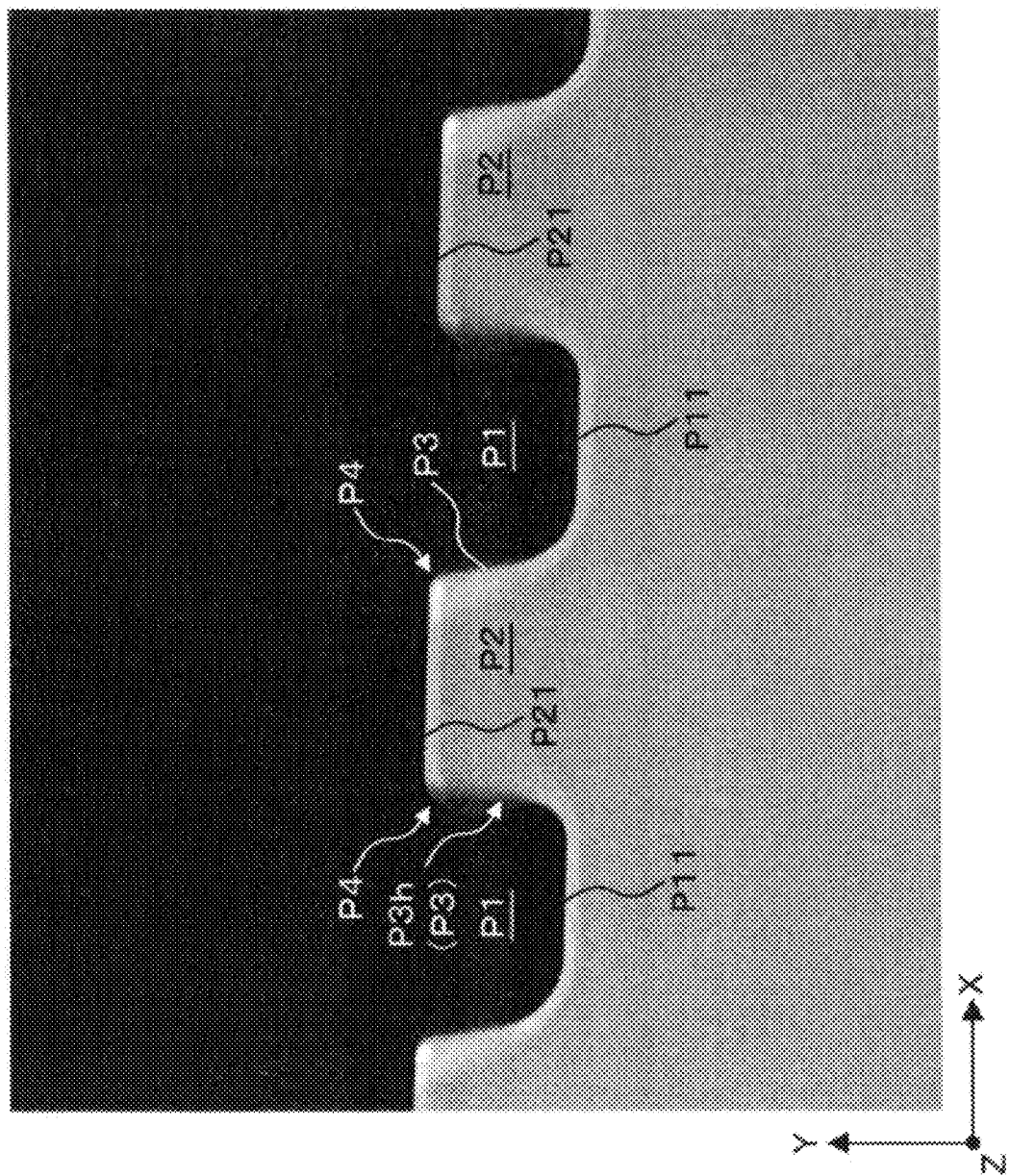

THREAD SHAPE MEASURING APPARATUS AND MEASURING METHOD

This is a National Phase Application filed under 35 U.S.C. § 371, of International Application No. PCT/JP2019/017883, filed Apr. 26, 2019, the contents of which are incorporated by reference.

TECHNICAL FIELD

The present invention relates to a measuring apparatus and a measuring method that measure a thread shape of a thread portion. The present invention is particularly suitable for measuring the thread shape of a threaded pipe with threads formed at end portions thereof, such as an oil well pipe. Further, the present invention is suitable for measuring thread shapes that are difficult to be measured by a silhouette method, a method using a contact probe, or a laser rangefinder in a triangulation system (the angle of a flank face, in particular, the angle of a hook-like flank face among flank faces, the curvature radius of a thread bottom end portion, and the like), as well as measuring a thread shape that can be measured by a conventional silhouette method.

BACKGROUND ART

Conventionally, in the case of connecting end portions of pipes such as oil well pipes to each other, there has been used a method of fastening a joint with a thread portion (a female thread portion) formed on an inner peripheral surface thereof to two threaded pipes, each of which has a thread portion (a male thread portion) formed on an outer peripheral surface of the end portion of the pipe.

A low dimensional accuracy of the thread portion formed at the end portion of the pipe may loosen a fastened state to the joint, resulting in the pipes being disconnected and coming off or a fluid flowing inside the pipes leaking to the outside. In the case of oil well pipes, in particular, requirements for dimensional accuracies or quality assurance levels of the thread portion are becoming strict year by year along with an increase in harshness of the oil well environments in recent years.

FIG. 1A and FIG. 1B are an end view schematically illustrating one example of an end portion shape of an oil well pipe. FIG. 1A is an end view of the end portion of the oil well pipe on one side in the radial direction (an end view cut along a plane including a thread axis A). FIG. 1B is an enlarged end view of a region enclosed by a dotted line with symbol C illustrated in FIG. A.

As illustrated in FIG. 1A, an end portion of an oil well pipe P consists of a thread portion provided with thread ridges P1 and thread grooves P2, a bevel portion provided adjacently to the thread portion on the pipe end face side relative to the thread portion, and a lip portion containing a seal, and so on and provided adjacently to the bevel portion on the pipe end face side relative to the bevel portion.

Recently, as the oil well pipe P, there has been used a pipe in which out of a pair of flank faces P3 defining each thread ridge P1 of the thread portion (faces between a top face P11 of the thread ridge P1 and bottom faces P21 of the thread groove P2), for example, the flank face P3 located on the side opposite to the pipe end face side is inclined so as to be closer to the pipe end face side as it moves from the top face P11 of the thread ridge P1 to the bottom face P21 of the thread groove P2. Further, conversely, there has been sometimes a case of using an oil well pipe in which the flank face P3 located on the pipe end face side is inclined so as to be closer to the side opposite to the pipe end face as it moves from the top face P11 of the thread ridge P1 to the bottom face P21 of the thread groove P2.

As above, the flank face that comes closer to the side opposite to the side where the flank face 3P is located as it moves from the top face P11 of the thread ridge P1 to the bottom face P21 of the thread groove P2 is referred to as a "hook-like flank face P3h" appropriately. In the oil well pipe P illustrated in FIG. 1A and FIG. 1B, the flank face P3 located on the side opposite to the pipe end face side is the hook-like flank face P3h.

Conventionally, an angle of the flank face P3 (an angle between the flank face P3 and a perpendicular line N to the thread axis A) B and a curvature radius of a thread bottom end portion (a portion where the flank face P3 intersects with the bottom face P21 of the thread groove P2) P4 are evaluated off-line using well-known methods and whether or not they are acceptable is determined by making comparisons with their tolerance ranges.

The evaluations as above require a lot of time and effort. Accordingly, it is difficult to inspect the entire number of oil well pipes P, resulting in a sampling inspection, such as an inspection being performed for first and last oil well pipes P in the same production lot.

Further, it is difficult to evaluate the thread shape quantitatively because the acceptability is determined merely based on the comparisons with the allowable ranges.

In order to solve such problems, Patent Literatures 1 to 3, for example, have proposed a method of measuring an external shape (a recessed and projecting shape of the surface, a thread profile) of the thread portion by emitting parallel lights from the direction orthogonal to the cross section including the thread axis A or along the bottom face P21 of the thread groove P2, and detecting the light that has not been blocked by the thread portion (a silhouette method). It is thought that if the thread profile of the thread portion can be accurately measured by this silhouette method, the angle of the flank face P3 and the curvature radius of the thread bottom end portion P4 can also be accurately calculated from the thread profile.

However, the silhouette method for detecting the transmitted light sometimes fails to accurately detect the flank face P3 because the flank face P3 falls in the shadow of a ridge line of the thread ridge P1. When the flank face P3 is the hook-like flank face P3h, in particular, detection by the silhouette method is impossible. Further, the same is true of the thread bottom end portion P4 that is located at the intersection of the flank face P3 with the bottom face P21 of the thread groove P2.

Thus, as described in Patent Literature 4, the present inventors have proposed a method of performing measurements related to the flank face P3 of the thread portion using a contact probe, in addition to the measurement by the silhouette method.

However, the measurement is performed while sequentially moving the contact probe to bring a spherical contactor attached to a Lip of the contact probe into contact with the flank face P3, resulting in long measurement time inevitably. In order to perform the measurement in a manufacturing line of the oil well pipe P, it is necessary to shorten the measurement time to a certain level or less, which means that a sufficient number of measurement points cannot be obtained inevitably. Therefore, if fine particles such as dust floating in the atmosphere where the measuring apparatus is installed adhere to any of the measurement points, a straight-line approximation with a small number of measurement points may result in a large error, and the angle of the flank face P3 cannot be accurately measured in some cases. The same is true of the case where particles adhere to the contactor. In order to prevent the particles from adhering to the thread portion of the oil well pipe P or the contactor of the contact probe, it is necessary to purify the atmosphere where the measuring apparatus is installed, clean the thread portion, clean the contactor, and the like, and in some cases, to replace or calibrate the contactor, resulting in that there is a problem of time-consuming. Further, the contactor wears out after being used repeatedly, and thus, there is also a problem that the measurement accuracy degrades due to the wear.

Further, the diameter of the contactor is 0.1 mm or more (paragraph 0067 of Patent Literature 4), so that it is difficult to measure the curvature radius of the thread bottom end portion P4 of about several hundred μm.

Furthermore, for example, Patent Literatures 5, 6 have proposed a method of measuring a thread shape by using a laser rangefinder in a triangulation system.

However, the surface of the end portion of the threaded pipe, such as an oil well pipe, is a metal surface obtained after machining. Therefore, if a specularly reflected light component of reflected light at the surface of the end portion of the threaded pipe is too strong, the laser rangefinder fails to sufficiently detect the reflected light (a scattered light component), the measurement accuracy is degraded, or the measurement becomes impossible in some cases. Further, in some cases, the laser rangefinder detects reflected light (multiple reflected light) from a place other than the original measurement place, resulting in a decrease in measurement accuracy. Accordingly, the method of measuring the thread shape using the laser rangefinder has a difficulty in performing stable measurements.

CITATION LIST

Patent Literature

Patent Literature 1: Japanese Patent No. 3552440
Patent Literature 2: Japanese Laid-open Patent Publication No. 63-212808
Patent Literature 3: Japanese Laid-open Patent Publication No. 2010-38554
Patent Literature 4: Japanese Patent No. 4486700
Patent Literature 5: Japanese Patent No. 5952269
Patent Literature 6: Japanese Laid-open Patent Publication No. 2016-75502

SUMMARY OF INVENTION

Technical Problem

The present invention has been made in order to solve the problems in the aforementioned prior arts, and has an object to provide a thread shape measuring apparatus, and the like that are capable of measuring thread shapes that are difficult to be measured by a conventional silhouette method, a method using a contact probe, or a laser rangefinder in a triangulation system as well as thread shapes that can be measured by a conventional silhouette method.

Solution to Problem

In order to solve the above-described problems, the present inventors earnestly examined the possibility of detecting a flank face and a thread bottom end portion by using an optical system for implementing the silhouette method. The present inventors examined the use of an illuminating unit that has an optical axis in a direction orthogonal to a cross section to be measured, the cross section including a thread axis of a thread portion, and emits parallel lights to illuminate the thread portion. Further, the present inventors examined the use of an optical system provided with an image-capturing unit that has a visual axis parallel to the optical axis of the illuminating unit, includes a telecentric lens, has a focusing position matching the aforementioned cross section, and detects, out of the parallel lights emitted from the illuminating unit, the light that has not been blocked by the thread portion to capture an image of the detected light. Here, the focusing position is a position at which a contrast value of the outer edge corresponding to the top face of the thread ridge or the bottom face of the thread groove peaks in the aforementioned cross section to be measured, that is, a position at which the difference or ratio in shading (lightness and darkness) between both sides across the aforementioned outer edge is the largest.

As a result, the present inventors found out that by leaving the image-capturing unit intact and tilting the optical axis of the illuminating unit more than a lead angle of the thread portion, a captured image with a shading pattern such as interference fringes generated in a pixel region, which corresponds to the flank face and the thread bottom end portion, can be obtained. The present inventors found out that it is possible to calculate the shapes of the flank face and the thread bottom end portion by extracting the pixel region where the shading pattern is generated in this captured image.

Accordingly, the present inventors found out that the shapes of the top face of the thread ridge and the bottom face of the thread groove can be calculated using the captured image obtained by using an ordinary optical system (the optical system in which the optical axis of the illuminating unit is parallel to the visual axis of the image-capturing unit) intended for conducting the silhouette method, and the shapes of the flank face and the thread bottom end portion can be calculated using the captured image obtained by using the optical system in which the optical axis of the illuminating unit is tilted. Further, since the image-capturing units of the both optical systems are common (image-capturing regions are common), the shapes obtained by the both optical systems can be easily combined, so that the present inventors found out that the thread shape can be arithmetically operated easily using the combined shape.

The present invention was completed based on the above-described findings of the present inventors.

That is, in order to solve the aforementioned problems, the present invention provides a thread shape measuring apparatus that includes: a first illuminating unit that has an optical axis in a direction orthogonal to a cross section including a thread axis of a thread portion and emits parallel lights to illuminate the thread portion; a second illuminating unit that has an optical axis in a direction forming an angle larger than a lead angle of the thread portion with respect to the direction orthogonal to the cross section and emits parallel lights to illuminate the thread portion; an image-capturing unit that has a visual axis parallel to the optical axis of the first illuminating unit, includes a telecentric lens, has a focusing position matching the cross section, and detects, out of the parallel lights emitted from the first illuminating unit or the second illuminating unit, the light that has not been blocked by the thread portion to capture an image of the detected light; and an arithmetic operation unit that arithmetically operates a thread shape of the thread portion based on a captured image captured by the image-capturing unit, in which the arithmetic operation unit performs image processing on a first captured image captured by detecting, out of the parallel lights emitted from the first illuminating unit, the light that has not been blocked by the thread portion, to thereby calculate a first outline being a partial outline of the thread portion along an axial direction of the thread axis in the cross section, performs image processing on a second captured image captured by detecting, out of the parallel lights emitted from the second illuminating unit, the light that has not been blocked by the thread portion, to thereby calculate a second outline being a partial outline of the thread portion along the axial direction of the thread axis in the cross section, and arithmetically operates the thread shape of the thread portion based on the first outline and the second outline that are calculated.

The first illuminating unit included in the thread shape measuring apparatus according to the present invention illuminates the thread portion and the image-capturing unit detects the light that has not been blocked by the thread portion to capture an image of the detected light, and thereby, in the obtained first captured image, a pixel region blocked by the thread portion becomes dark and a pixel region that is not blocked by the thread portion becomes bright. Therefore, the arithmetic operation unit performs the image processing such as binarization, for example, on the first captured image, thereby making it possible to calculate the first outline being a partial outline of the thread portion along the axial direction of the thread axis in the cross section including the thread axis. In this first outline, top faces of thread ridges and bottom faces of thread grooves are included, but flank faces and thread bottom end portions are not included.

On the other hand, the second illuminating unit included in the thread shape measuring apparatus according to the present invention illuminates the thread portion and the image-capturing unit detects the light that has not been blocked by the thread portion to capture an image of the detected light, and thereby the obtained second captured image becomes an image in which a shading pattern such as interference fringes is generated in a pixel region corresponding to the flank face and the thread bottom end portion. Therefore, the arithmetic operation unit performs, on the second captured image, the image processing to extract the pixel region in which a shading pattern such as interference fringes is generated, thereby making it possible to calculate the second outline being a partial outline of the thread portion along the axial direction of the thread axis in the cross section. In this second outline, the flank face and the thread bottom end portion are included. That is, the arithmetic operation unit can calculate the second outline including the outlines of the flank face and the thread bottom end portion of the thread portion.

Then, the arithmetic operation unit arithmetically operates the shape of the thread portion based on the first outline and the second outline that are calculated. For example, the arithmetic operation unit can arithmetically operate, based on the first outline, a phase of the thread ridge corresponding to the position of the thread ridge in the axial direction of the thread axis, a thread diameter being an outside diameter of the thread ridge from the pipe end face to a predetermined position in the axial direction of the thread axis, a taper shape being a change in diameter of the bottom face of the thread groove along the axial direction of the thread axis, and so on. Further, for example, the arithmetic operation unit can arithmetically operate an angle of the flank face and a curvature radius of the thread bottom end portion based on the second outline. Furthermore, the arithmetic operation unit can calculate a combined outline obtained by combining the first outline and the second outline, and arithmetically operate a width of the thread ridge and a width of a thread valley based on the calculated combined outline.

As above, according to the thread shape measuring apparatus according to the present invention, it is possible to measure the thread shape that can be measured by a conventional silhouette method by using the first captured image and measure the thread shapes that are difficult to be measured by a conventional silhouette method, a method using a contact probe, or a laser rangefinder in a triangulation system by using the second captured image.

Incidentally, the image-capturing unit included in the thread shape measuring apparatus according to the present invention has its focusing position matching the cross section including the thread axis (a cross section where the thread shape should be measured). That is, the focusing position of the image-capturing unit is located at the top face of the thread ridge and the bottom face of the thread groove in the cross section to be measured. Incidentally, in the case where the focusing position of the image-capturing unit does not match the cross section including the thread axis, the image-capturing unit is moved in the visual axis direction to be adjusted.

Further, the first illuminating unit and the second illuminating unit included in the thread shape measuring apparatus according to the present invention can also be completely separate illuminating units, but are not limited to these. For example, the first illuminating unit and the second illuminating unit may be configured to switch between the function as the first illuminating unit and the function as the second illuminating unit by changing positions or tilts of members composing the same illuminating unit, or the like.

Preferably, the aforementioned arithmetic operation unit performs the image processing on the aforementioned second captured image, to thereby calculate a focusing measure of pixels constituting the second captured image and calculate the aforementioned second outline based on the calculated focusing measure.

As described previously, the second captured image becomes an image in which a shading pattern such as interference fringes is generated in a pixel region corresponding to the flank face and the thread bottom end portion. As a method of extracting a region in which this shading pattern such as interference fringes is generated, using the focusing measure is considered. Here, the focusing measure means a measure representing the degree of being in focus. Concretely, as the focusing measure, for example, the contrast or image density deviation between surrounding pixels can be used. The arithmetic operation unit can calculate, as the second outline, a pixel with a high focusing measure out of the pixels constituting the second captured image.

For example, in the second captured image, the direction substantially perpendicular to the second outline (the flank face, and the like) to be calculated (the axis of this direction is referred to as a "pixel direction axis") can be geometrically estimated based on the first outline calculated beforehand or a design drawing. The arithmetic operation unit can also calculate a focusing measure distribution in which the horizontal axis is the pixel direction axis and the vertical axis is the focusing measure, find an approximate curve of this focusing measure distribution (a curve having a convex upward), and employ the vertex of this approximate curve as a point that constitutes the second outline. Thereby, the second outline consisting of the points with the highest focusing measure is calculated at a resolution higher than a pixel resolution.

Further, in order to solve the aforementioned problems, the present invention provides a thread shape measuring method including the following steps.

(1) A first illuminating step: illuminating a thread portion by a first illuminating unit that has an optical axis in a direction orthogonal to a cross section including a thread axis of the thread portion and emits parallel lights.

(2) A first image-capturing step: detecting, out of the parallel lights emitted from the first illuminating unit, the light that has not been blocked by the thread portion to capture an image of the detected light by an image-capturing unit that has a visual axis parallel to the optical axis of the first illuminating unit, includes a telecentric lens, and has a focusing position matching the cross section.

(3) A second illuminating step: illuminating the thread portion by a second illuminating unit that has an optical axis in a direction forming an angle larger than a lead angle of the thread portion with respect to the direction orthogonal to the cross section and emits parallel lights.

(4) A second image-capturing step: detecting, out of the parallel lights emitted from the second illuminating unit, the light that has not been blocked by the thread portion to capture an image of the detected light by the image-capturing unit.

(5) A first outline calculating step: performing image processing on a first captured image captured by the first image-capturing step, to thereby calculate a first outline being a partial outline of the thread portion along an axial direction of the thread axis in the cross section.

(6) A second outline calculating step: performing image processing on a second captured image captured by the second image-capturing step, to thereby calculate a second outline being a partial outline of the thread portion along the axial direction of the thread axis in the cross section.

(7) A thread shape arithmetic operation step: arithmetically operating a thread shape of the thread portion based on the first outline calculated by the first outline calculating step and the second outline calculated by the second outline calculating step.

Incidentally, it is not necessary to execute the respective steps included in the thread shape measuring method according to the present invention in the order described above. However, a step that uses an execution result of another step needs to be executed later than the step in which the execution result is used.

It is also possible to execute the first illuminating step and the first image-capturing step in this order after executing the second illuminating step and the second image-capturing step in this order, for example. Further, it is also possible to execute the second illuminating step, the second image-capturing step, and the second outline calculating step in this order after executing the first illuminating step, the first image-capturing step, and the first outline calculating step in this order. Further, it is also possible to execute the first illuminating step, the first image-capturing step, and the first outline calculating step in this order after executing the second illuminating step, the second image-capturing step, and the second outline calculating step in this order.

Advantageous Effects of Invention

According to the present invention, it is possible to measure thread shapes that are difficult to be measured by a conventional silhouette method, a method using a contact probe, or a laser rangefinder in a triangulation system as well as thread shapes that can be measured by a conventional silhouette method.

BRIEF DESCRIPTION OF DRAWINGS

FIG. 1A is an end view illustrating one example of an end portion shape of an oil well pipe.

FIG. 2A is a front view illustrating one example of a thread shape measuring apparatus in this embodiment.

FIG. 2B is a side view illustrating one example of the thread shape measuring apparatus in this embodiment.

FIG. 3A is a side view illustrating a configuration example of an illuminating unit 200A.

FIG. 3B is a side view illustrating a configuration example of an illuminating unit 200B.

FIG. 3C is a side view illustrating a configuration example of an illuminating unit 200C.

FIG. 3D is a side view illustrating a configuration example of an illuminating unit 200D.

FIG. 6A is a view illustrating one example of a first captured image.

DESCRIPTION OF EMBODIMENTS

Figure 1B:
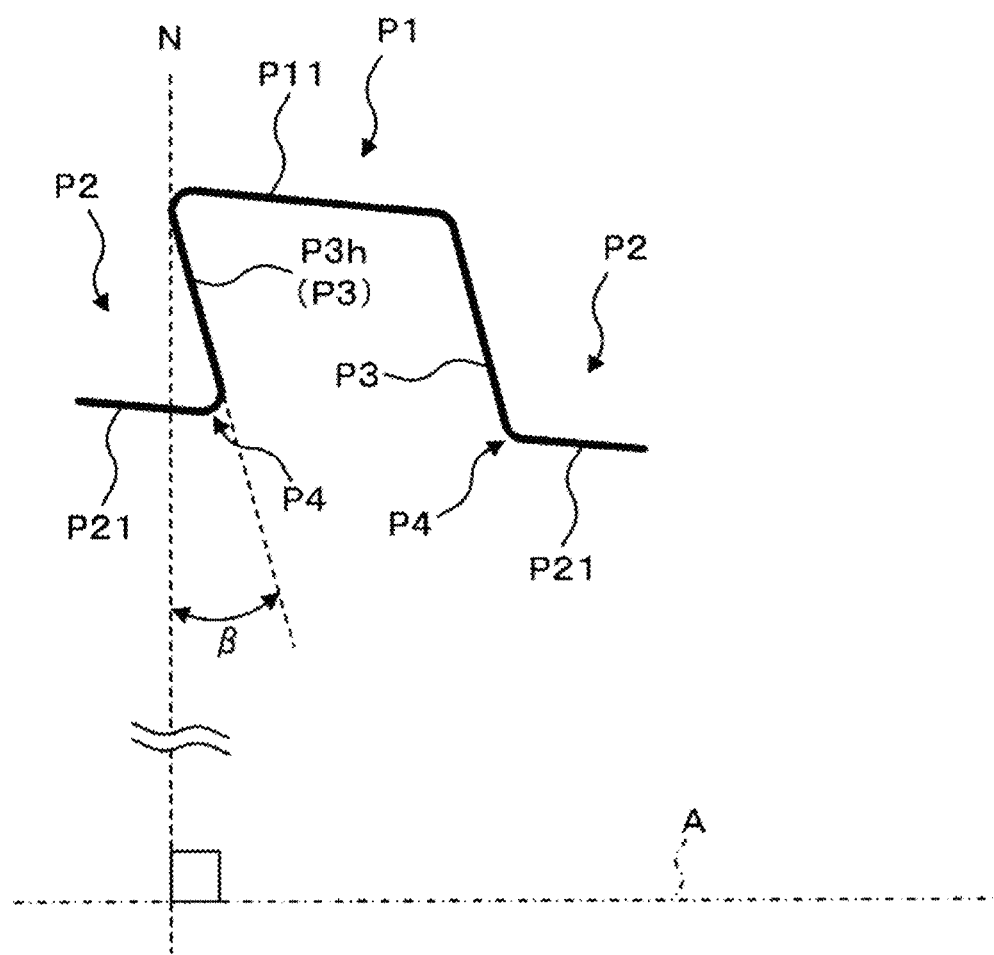
FIG. 1B is an enlarged view of an enlarged portion of FIG. 1A.

Hereinafter, there will be explained a thread shape measuring apparatus and a thread shape measuring method according to one embodiment of the present invention while appropriately referring to the attached drawings. Incidentally, in this embodiment, there will be explained the case of measuring a thread shape of a thread portion formed at an end portion of a threaded pipe, but the case of measuring other thread shapes is also applicable.

<Thread Shape Measuring Apparatus>

FIG. 2A and FIG. 2B are views schematically illustrating a schematic configuration of the thread shape measuring apparatus according to this embodiment. FIG. 2A is a front view viewed from an axial direction of a thread axis A (an X direction). FIG. 2B is a side view viewed from a direction orthogonal to the thread axis A and parallel to a cross section including the thread axis A (a horizontal plane in this embodiment) M (a Y direction). Incidentally, an optical axis located on the right of FIG. 2A is illustrated in FIG. 2B.

As illustrated in FIG. 2A, a thread shape measuring apparatus 100 according to this embodiment is an apparatus that measures a thread shape of a thread portion formed at an end portion of a threaded pipe P. The thread shape measuring apparatus 100 includes a first illuminating unit 1, a second illuminating unit 2, an image-capturing unit 3, and an arithmetic operation unit 4.

The first illuminating unit 1, the second illuminating unit 2, and the image-capturing unit 3 are attached to a beam 5 extending in an up and down direction (a Z direction) so as to be integrally movable in the up and down direction. Further, the first illuminating unit 1 and the second illuminating unit 2 each are formed of an illuminating unit 200. The illuminating unit 200 switches between the function as the first illuminating unit 1 and the function as the second illuminating unit 2 by changing positions or tilts of members composing the illuminating unit 200. Further, the measuring apparatus 100 in this embodiment includes two sets of the same optical system (the first illuminating unit 1, the second illuminating unit 2, and the image-capturing unit 3) in order to illuminate and capture images of portions facing in the Y direction across the thread axis A of the threaded pipe P.

Incidentally, in FIG. 2A and FIG. 2B, a part (thread ridges P1 and a thread groove P2) of the thread shape is only illustrated. Further, in FIG. 2B, the portion of the threaded pipe P that is not hatched is the end portion of the threaded pipe P. At the end portion of the threaded pipe P, the thread portion, a bevel portion, and a lip portion are formed (see FIG. 1A). The threaded pipe P is fixed by chucks (not illustrated) or the like when the thread shape measuring apparatus 100 measures the thread shape.

Hereinafter, there will be sequentially explained components included in the thread shape measuring apparatus 100. [First Illuminating Unit 1 and Second Illuminating Unit 2]

The first illuminating unit 1 has an optical axis in a direction orthogonal to the cross section M including the thread axis A of the threaded pipe P (the Z direction) and emits parallel lights L1 (a solid-line arrow illustrated in FIG. 2B) to illuminate the end portion of the threaded pipe P.

The second illuminating unit 2 has an optical axis in a direction forming an angle θ larger than a lead angle γ of the thread portion with respect to the direction orthogonal to the cross section M (the Z direction) and emits parallel lights L2 (a dotted-line arrow illustrated in FIG. 2B) to illuminate the end portion of the threaded pipe P. The parallel light L2 reflects on a flank face P3 and the image-capturing unit 3 needs to detect a specularly reflected component of the reflected light to capture an image of the specularly reflected component, and thus, the angle θ is preferably set to about 2γ.

In practice, depending on the type of thread, the lead angle γ varies (the maximum lead angle is set to $\gamma_{max}$ and the minimum lead angle is set to $\gamma_{min}$, below), and thus, the optical axis is preferably adjusted so that the angle θ of the optical axis of the second illuminating unit 2 satisfies θ=2γ according to the lead angle γ of the thread portion to be measured. In practical application, $2(\gamma_{max}-\gamma_{min})$ is not very large, and thus, the parallel light L2 with the same degree of spread as $2(\gamma_{max}-\gamma_{min})$ may be emitted from the second illuminating unit 2 with the angle θ of the optical axis set to the angle $\theta \approx (\gamma_{max}+\gamma_{min})$.

Concretely, the angle θ of the optical axis of the second illuminating unit 2 is preferably set to θ≤4° by giving a margin to it while considering the equipment restrictions, bending of the threaded pipe P, or the like.

Incidentally, when viewed from the direction orthogonal to the thread axis A and parallel to the cross section M (the Y direction), the angle θ is an angle on the same side as the lead angle γ (counterclockwise in the example illustrated in FIG. 2B) with respect to the Z direction.

Hereinafter, there will be explained concrete configuration examples of the first illuminating unit 1 and the second illuminating unit 2 (the illuminating unit 200 in this embodiment) with reference to FIG. 3A, FIG. 3B, FIG. 3C, and FIG. 3D. Incidentally, in FIG. 3A, FIG. 3B, FIG. 3C, and FIG. 3D, the illustration of the threaded pipe P is omitted.

FIG. 3A is a side view schematically illustrating an illuminating unit 200A according to a first configuration example.

The illuminating unit 200A includes a light source 11 and a goniometer stage 12.

As the light source 11, for example, a lens-attached LED illumination, a lens-attached halogen lamp, a laser, or the like is used. However, the light source 11 only needs to be the one that emits parallel lights, and is not limited.

The goniometer stage 12 is driven so as to pivot an optical axis of the light source 11 about the axis in the Y direction. The light source 11 in a state illustrated by a solid line in FIG. 3A has an optical axis in a direction orthogonal to the cross section M including the thread axis A of the threaded pipe P (the Z direction) and emits the parallel lights L1 (only the optical axis of the parallel light L1 is illustrated in FIG. 3A) to illuminate the end portion of the threaded pipe P. That is, the illuminating unit 200A in a state illustrated by the solid line functions as a first illuminating unit 1A.

The light source 11 in a state illustrated by a dotted line in FIG. 3A has an optical axis in a direction forming the angle θ with respect to the direction orthogonal to the cross section M (the Z direction) and emits the parallel lights L2 (only the optical axis of the parallel light L2 is illustrated in FIG. 3A) to illuminate the end portion of the threaded pipe P. That is, the illuminating unit 200A in a state illustrated by the dotted line functions as a second illuminating unit 2A.

FIG. 3B is a side view schematically illustrating an illuminating unit 200B according to a second configuration example.

The illuminating unit 200B includes two LEDs 13a, 13b, and a lens 14.

One LED 13a is arranged on an optical axis of the lens 14, and the other LED 13b is arranged at a position deviating from the optical axis of the lens 14 in the X direction. The distance in the Z direction between the LEDs 13a, 13b and the lens 14 is almost equal to the focal distance of the lens 14.

The lights emitted from the LED 13a become the parallel lights L1 (only the optical axis of the parallel light L1 is illustrated in FIG. 3B) by the lens 14 and illuminate the end portion of the threaded pipe P from the direction orthogonal to the cross section M including the thread axis A of the threaded pipe P (the Z direction). That is, the combination of the LED 13a and the lens 14 functions as a first illuminating unit 1B.

The lights emitted from the LED 13b become the parallel lights L2 (only the optical axis of the parallel light L2 is illustrated in FIG. 3B) by the lens 14 and illuminate the end portion of the threaded pipe P from the direction forming the angle θ with respect to the direction orthogonal to the cross section M (the Z direction). That is, the combination of the LED 13b and the lens 14 functions as a second illuminating unit 2B.

FIG. 3C is a side view schematically illustrating an illuminating unit 200C according to a third configuration example.

The illuminating unit 200C includes a light source 11 and a diffuser plate 15.

The light source 11 is arranged so that its optical axis is located in a direction forming the angle θ with respect to the direction orthogonal to the cross section M including the thread axis A of the threaded pipe P (the Z direction). Incidentally, as the light source 11, the same one as the light source 11 explained in FIG. 3A can be used.

The diffuser plate 15 has one end thereof attached to a pivot shaft 16 provided on the beam 5 and is capable of pivoting about the pivot shaft 16 (about the axis in the Y direction). The diffuser plate 15 is capable of pivoting between the position illuminated by parallel lights emitted from the light source 11 (a position illustrated by a solid line in FIG. 3C) and the position that is not illuminated by the parallel lights emitted from the light source 11 (a position illustrated by a dotted line in FIG. 3C).

In FIG. 3C, in the case of the diffuser plate 15 being in a state illustrated by the solid line, the parallel lights L2 emitted from the light source 11 (only the optical axis of the parallel light L2 is illustrated in FIG. 3C) are diffused by illuminating the diffuser plate 15. On this occasion, out of the diffused lights, components of the parallel lights L1 (only the optical axis of the parallel light L1 is illustrated in FIG. 3C) having an optical axis in a direction orthogonal to the cross section M (the Z direction) are generated, and these components illuminate the end portion of the threaded pipe P. That is, the combination of the diffuser plate 15 in a state illustrated by the solid line and the light source 11 functions as a first illuminating unit 1C.

Further, in FIG. 3C, in the case of the diffuser plate 15 in a state illustrated by the dotted line, the parallel lights 12 emitted from the light source 11 go straight ahead as they are without illuminating the diffuser plate 15. Accordingly, the light source 11 illuminates the end portion of the threaded pipe P by the parallel lights L2 from the direction forming the angle θ with respect to the direction orthogonal to the cross section M (the Z direction). That is, the combination of the diffuser plate 15 in a state illustrated by the dotted line and the light source 11 functions as a second illuminating unit 2C.

Incidentally, in place of the diffuser plate 15 included in the illuminating unit 200C, a glass plate having a wedge (a glass plate whose front and rear surfaces are not parallel) may be used. As long as a wedge angle of this glass plate (an angle formed by the front surface and the rear surface) is set to the angle θ, in the case where the parallel lights L2 emitted from the light source 11 illuminate the front surface or the rear surface of the glass plate, the parallel lights L2 are refracted to be the parallel lights L1.

FIG. 3D is a side view schematically illustrating an illuminating unit 200D according to a fourth configuration example.

The illuminating unit 200D includes a light source 11 and a pivot member 17.

The light source 11 is attached to the pivot member 17. Incidentally, as the light source 11, the same one as the light source 11 explained in FIG. 3A can be used.

The pivot member 17 has one end thereof attached to a pivot shaft 18 provided on the beam 5 and is capable of pivoting about the pivot shaft 18 (about the axis in the Y direction).

The pivot member 17 is pivoted, and thereby the optical axis of the light source 11 pivots about the axis in the Y direction. The light source 11 in a state illustrated by a solid line in FIG. 3D has an optical axis in a direction orthogonal to the cross section M including the thread axis A of the threaded pipe P (the Z direction) and emits the parallel lights L1 (only the optical axis of the parallel light L1 is illustrated in FIG. 3D) to illuminate the end portion of the threaded pipe P. That is, the illuminating unit 200D in a state illustrated by the solid line functions as a first illuminating unit 11.

The light source 11 in a state illustrated by a dotted line in FIG. 3D has an optical axis in a direction forming the angle θ with respect to the direction orthogonal to the cross section M (the Z direction) and emits the parallel lights L2 (only the optical axis of the parallel light L2 is illustrated in FIG. 3D) to illuminate the end portion of the threaded pipe P. That is, the illuminating unit 200D in a state illustrated by the dotted line functions as a second illuminating unit 2D.

Incidentally, cross sections vertical to optical axes of light fluxes of the parallel lights L1 and the parallel lights L2 emitted by the first illuminating units 1 (1A to 1D) and the second illuminating units 2 (2A to 2D) of the illuminating units 200 (200A to 200D) respectively each have an area sufficiently larger than a range detected and captured by the image-capturing unit 3 (namely, an image-capturing visual field).

[Image-Capturing Unit 3]

The image-capturing unit 3 detects, out of the parallel lights L1 emitted from the first illuminating unit 1 or the parallel lights L2 emitted from the second illuminating unit 2, the light that has not been blocked by the thread portion to capture an image of the detected light.

As illustrated in FIG. 2A and FIG. 2B, the image-capturing unit 3 includes an image-capturing main body unit 31 and a telecentric lens 32 attached to the image-capturing main body unit 31. The image-capturing main body unit 31 includes an image sensor such as a CCD or CMOS arranged two-dimensionally. Further, the image-capturing unit 3 includes the telecentric lens 32, and thereby the image sensor in the image-capturing main body unit 31 can easily receive a parallel light component.

The image-capturing unit 3 has the visual axis parallel to the optical axis of the first illuminating unit 1 (namely, the visual axis in the Z direction). That is, of the image-capturing unit 3, a light-receiving surface that receives the light from the first illuminating unit 1 (an imaging area of the image sensor) is orthogonal to the optical axis of the first illuminating unit 1. Then, since the image-capturing unit 3 includes the telecentric lens 32, an angle of view near an object surface is 0° and the magnification is constant, which is suitable for dimensional measurement. Further, the fact that the visual axis is in the Z direction has the advantage of suppressing the error caused when performing what is called sub-pixel processing on the captured image used for calculating the first outline by the silhouette method and achieving higher resolution. Further, the cross section M including the thread axis A of the threaded pipe P matches the focusing position of the image-capturing unit 3. Concretely, as described previously, the image-capturing unit 3 is movable in the up and down direction (the Z direction) on the beam 5 (movable integrally with the illuminating unit 200), and the position of the image-capturing unit 3 in the up and down direction is adjusted so that its focusing position matches the cross section M.

[Arithmetic Operation Unit 4]

The arithmetic operation unit 4 arithmetically operates the thread shape of the thread portion formed at the end portion of the threaded pipe P based on the captured image captured by the image-capturing unit 3.

Figure 4:
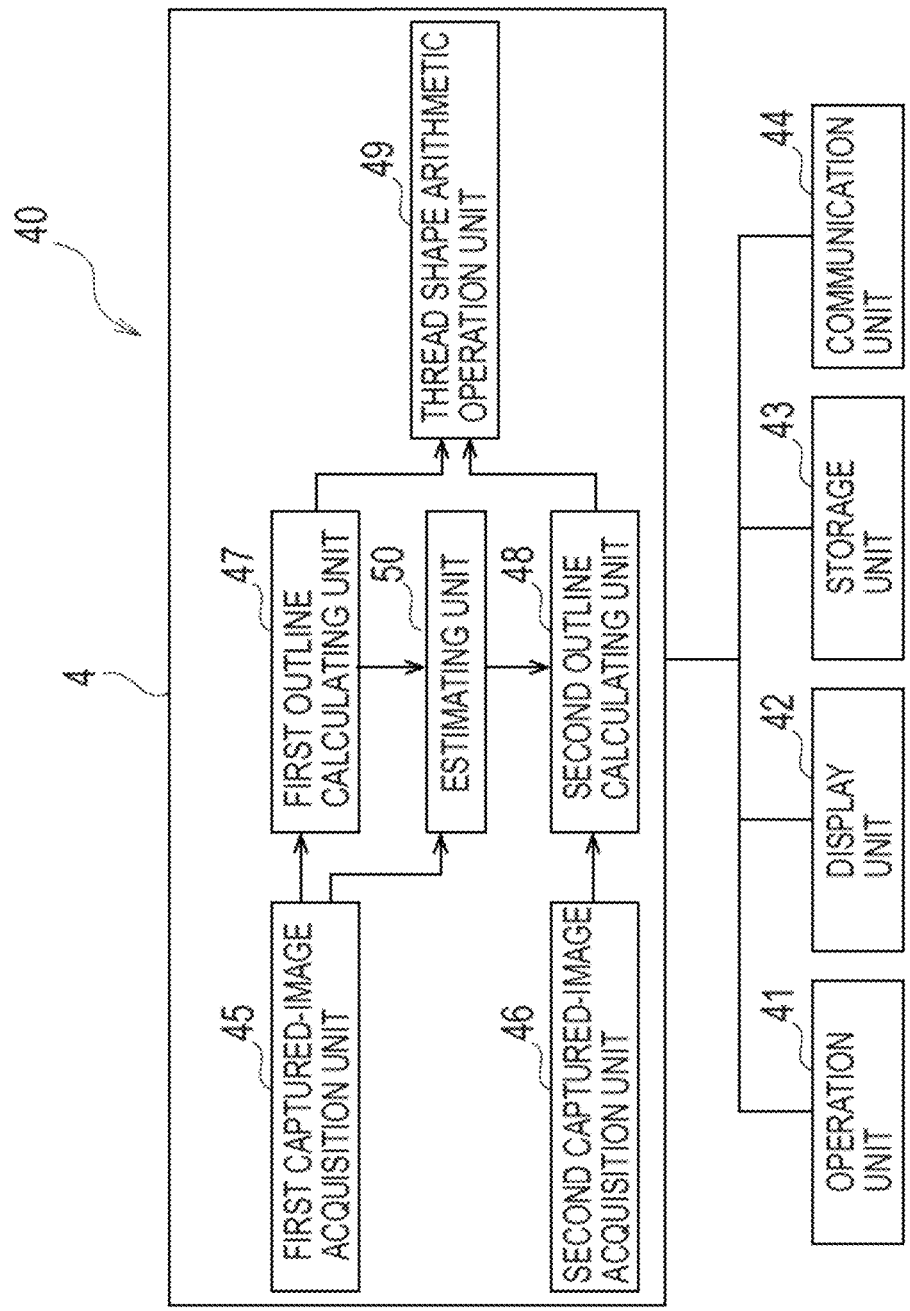
FIG. 4 is a diagram illustrating one example of a configuration of an arithmetic operation unit 4.

The arithmetic operation unit 4 is configured by a part of an arithmetic processing device 40 such as a personal computer. FIG. 4 is a diagram illustrating one example of a configuration of the arithmetic processing device 40. The arithmetic processing device 40 includes the arithmetic operation unit 4, an operation unit 41, a display unit 42, a storage unit 43, a communication unit 44, and so on.

The arithmetic operation unit 4 is at least one processor (including circuits). The processor of the arithmetic operation unit 4 executes programs stored in the storage unit 43, and thereby the function of the arithmetic operation unit 4 is achieved. The arithmetic operation unit 4 includes a first captured-image acquisition unit 45, a second captured-image acquisition unit 46, a first outline calculating unit 47, a second outline calculating unit 48, a thread shape arithmetic operation unit 49, and an estimating unit 50. Further, the arithmetic operation unit 4 controls the operation unit 41, the display unit 42, the storage unit 43, and the communication unit 44.

The first captured-image acquisition unit 45 acquires the later-described first captured image from the image-capturing unit 3 via the communication unit 44. The second captured-image acquisition unit 46 acquires the later-described second captured image from the image-capturing unit 3 via the communication unit 44.

The first outline calculating unit 47 calculates the first outline of the thread shape based on the first captured image acquired by the first captured-image acquisition unit 45. The second outline calculating unit 48 calculates the second outline of the thread shape based on the second captured image acquired by the second captured-image acquisition unit 46.

The thread shape arithmetic operation unit 49 arithmetically operates the thread shape based on the first outline calculated by the first outline calculating unit 47 and the second outline calculated by the second outline calculating unit 48.

The estimating unit 50 estimates, of the second captured image, a range where the second outline is located.

The operation unit 41 is for a measurer to input instructions to the arithmetic operation unit 4 and the like, and is, for example, a keyboard, a mouse, a touch panel, or the like. The display unit 42 is to display various pieces of information, and is, for example, a liquid-crystal display, an organic EL display, or the like. The storage unit 43 is to store various pieces of information, and is, for example, a RAM, a ROM, a hard disk drive, or the like. In the storage unit 43, there are stored programs for executing at least later-described pieces of arithmetic processing (a first outline calculating step S5, a second outline calculating step S6, and a thread shape arithmetic operation step S7). The communication unit 44 is to communicate with the image-capturing unit 3 and external devices.

<Thread Shape Measuring Method>

Figure 5:
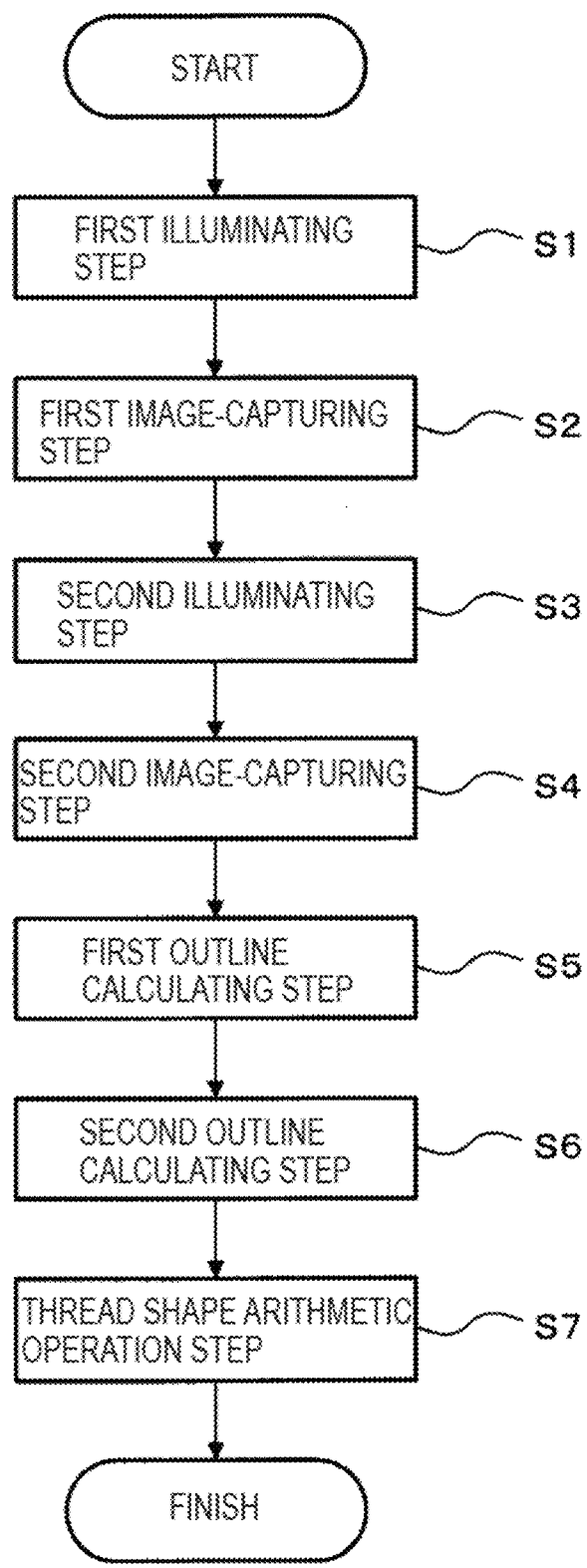
FIG. 5 is a flowchart illustrating one example of a thread shape measuring method according to this embodiment.

Next, there will be explained a thread shape measuring method using the above-described thread shape measuring apparatus 100. FIG. 5 is a flowchart illustrating schematic steps of the thread shape measuring method according to this embodiment.

The thread shape measuring method according to this embodiment includes: a first illuminating step S1, a first image-capturing step S2, a second illuminating step S3, a second image-capturing step S4, a first outline calculating step S5, a second outline calculating step S6, and a thread shape arithmetic operation step S7.

The respective steps will be explained sequentially.

[First illuminating step S1]

In the first illuminating step S1, the first illuminating unit 1 of the illuminating unit 200 illuminates the end portion of the threaded pipe P. In the case of the illuminating unit 200B illustrated In FIG. 3B, for example, a measurer turns on the LED 13a (turns off the LED 13b) in order to make the illuminating unit 200B function as the first illuminating unit 1B. Accordingly, the parallel lights L1 of the LED 13a illuminate the end portion of the threaded pipe P through the lens 14.

[First Image-Capturing Step S2]

In the first image-capturing step S2, the image-capturing unit 3 detects, out of the parallel lights L1 emitted from the first illuminating unit 1, the light that has not been blocked by the thread portion to capture an image of the detected light. A captured image captured by the first image-capturing step S2 is referred to as the first captured image. The first captured image is equivalent to a captured image obtained by a conventional silhouette method. The image-capturing unit 3 may capture an image according to an image-capturing instruction from the measurer, or may automatically capture an image according to an amount of the detected light. The image-capturing unit 3 transmits the captured first captured image to the arithmetic operation unit 4.

Figure 6B:
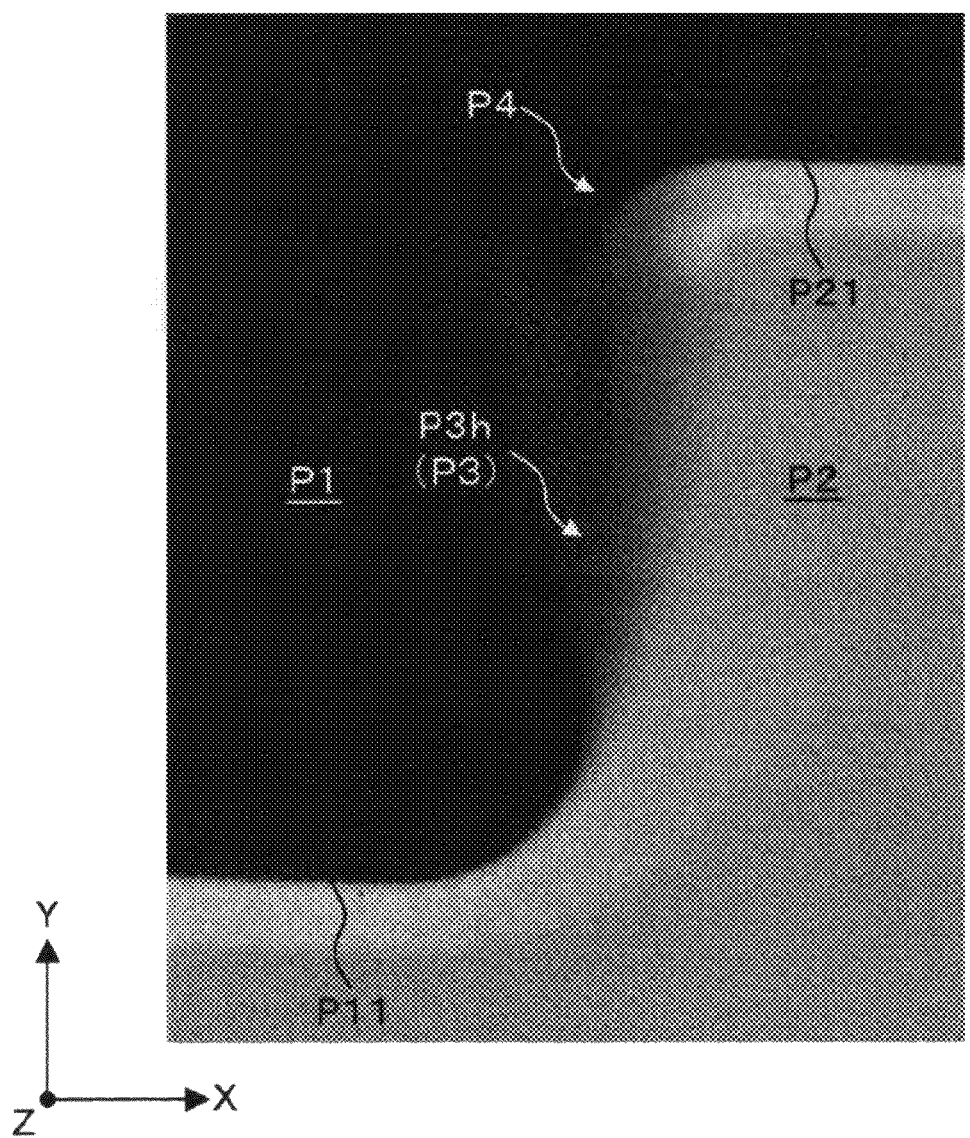
FIG. 6B is an enlarged view of an enlarged portion of FIG. 6A.

FIG. 6A and FIG. 6B are views illustrating one example of the first captured image captured by the first image-capturing step S2. FIG. 6A is a view illustrating the whole first captured image. FIG. 6B is a view illustrating an enlarged view of the vicinity of the flank face P3 (a hook-like flank face P3h).

As illustrated in FIG. 6A and FIG. 6B, in the first captured image, a pixel region blocked by the thread portion is dark and a not-blocked pixel region is bright. Further, in the first captured image, a pixel region corresponding to the top face P11 of the thread ridge P1 and the bottom face P21 of the thread groove P2 has a high contrast. Therefore, as will be described later, the arithmetic operation unit 4 performs image processing such as, for example, binarization on the first captured image, thereby making it possible to calculate the outlines of the top face P11 of the thread ridge P1 and the bottom face P21 of the thread groove P2.

On the other hand, as illustrated in FIG. 6A and FIG. 6B, in the first captured image, a pixel region corresponding to the flank face P3 has a low contrast because the flank face P3 falls in the shadow of a ridge line of the thread ridge P1. Therefore, even when the image processing such as binarization is performed on the first captured image, it is impossible to calculate the outline of the flank face P3. Further, it is also impossible to calculate the outline of the thread bottom end portion P4.

[Second Illuminating Step S3]

In the second illuminating step S3, the second illuminating unit 2 of the illuminating unit 200 illuminates the end portion of the threaded pipe P in the case of the illuminating unit 200B illustrated in FIG. 3B, for example, the measurer turns on the LED 13b (turns off the LED 13a) in order to make the illuminating unit 200B function as the second illuminating unit 2B. Accordingly, the parallel lights L2 of the LED 13b illuminate the end portion of the threaded pipe P through the lens 14.

[Second Image-Capturing Step S4]

In the second image-capturing step S4, the image-capturing unit 3 detects, out of the parallel lights L2 emitted from the second illuminating unit 2, the light that has not been blocked by the thread portion to capture an image of the detected light. At this time, the image-capturing unit 3 captures an image while maintaining image-capturing conditions in the first image-capturing step S2, that is, while maintaining the position of the image-capturing unit 3. The captured image captured by the second image-capturing step S4 is referred to as the second captured image. The image-capturing unit 3 may capture an image according to an image-capturing instruction from the measurer, or may automatically capture an image according to an amount of the detected light. The image-capturing unit 3 transmits the captured second captured image to the arithmetic operation unit 4.

Figure 7A:
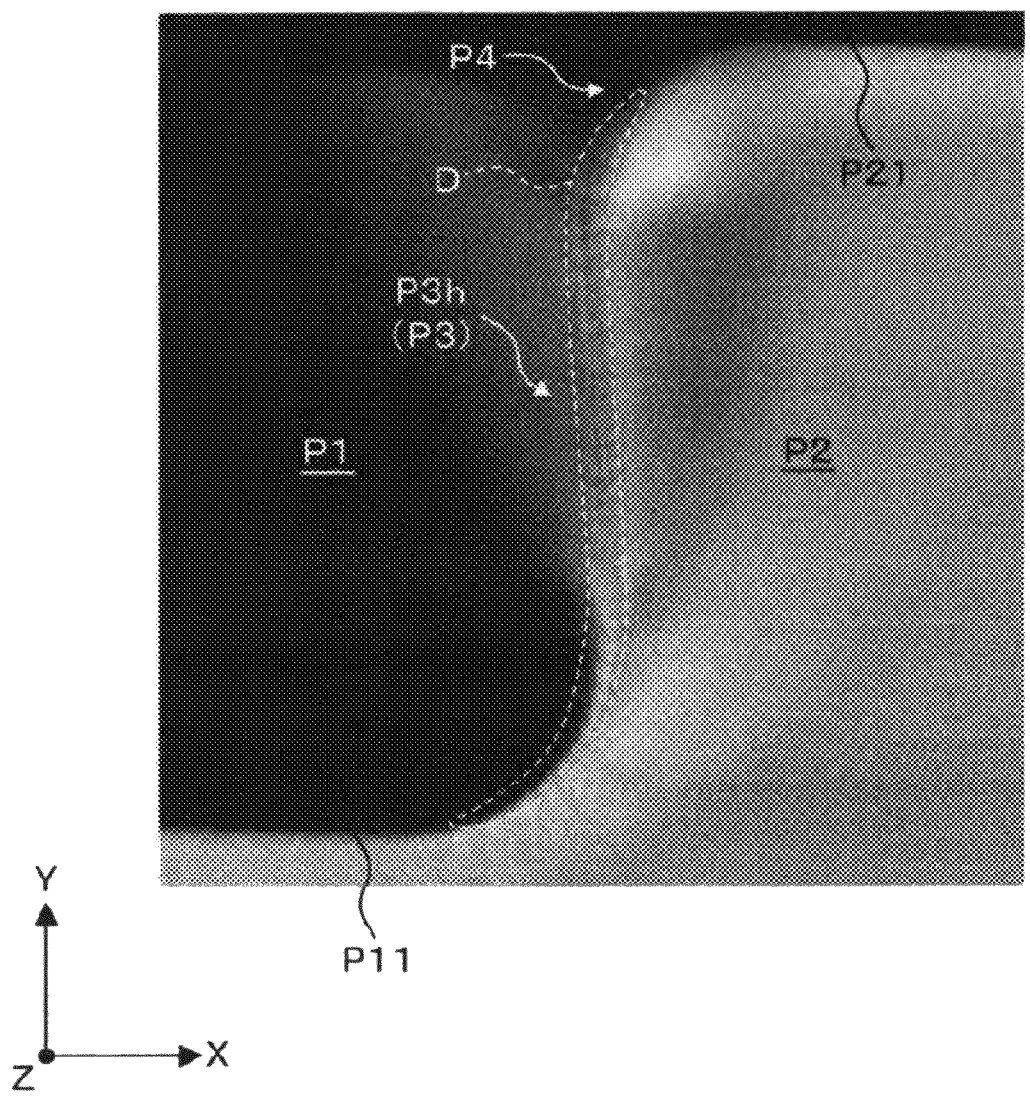
FIG. 7A is a view illustrating one example of a second captured image.
Figure 7B:
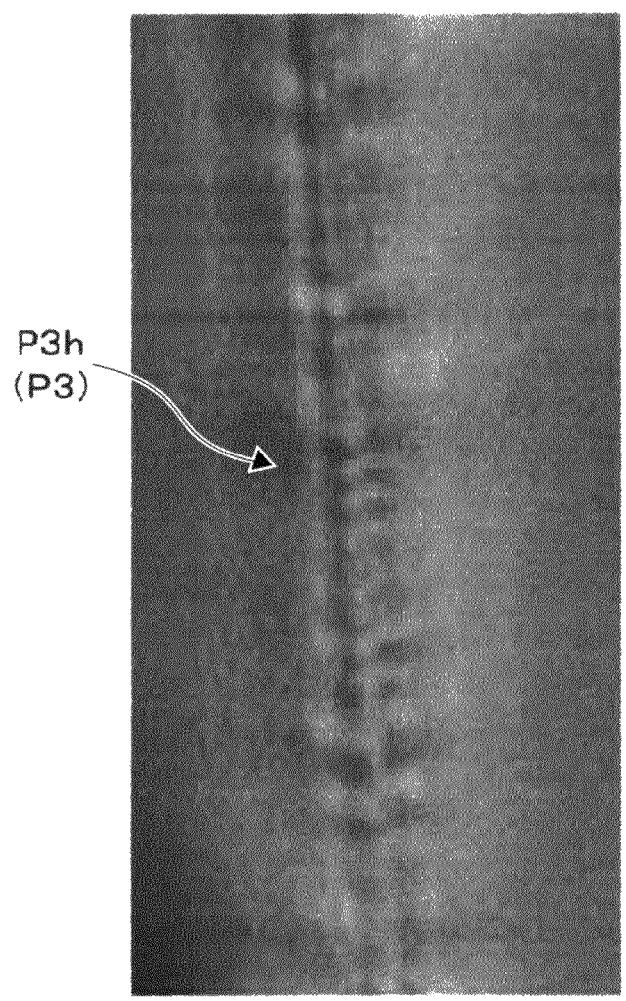
FIG. 7B is an enlarged view of an enlarged portion of FIG. 7A.
Figure 7C:
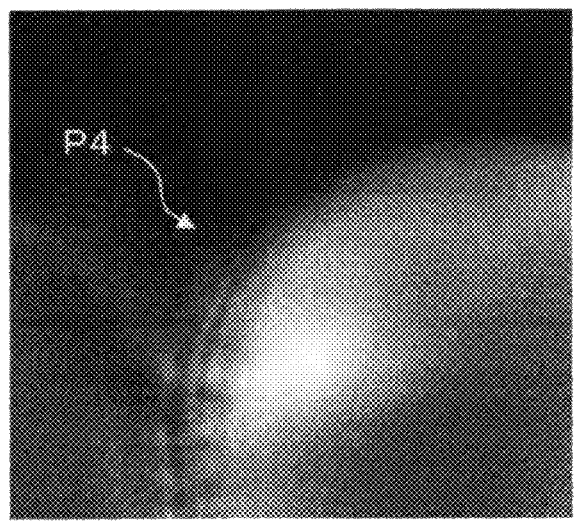
FIG. 7C is an enlarged view of an enlarged portion of FIG. 7A.
Figure 7D:
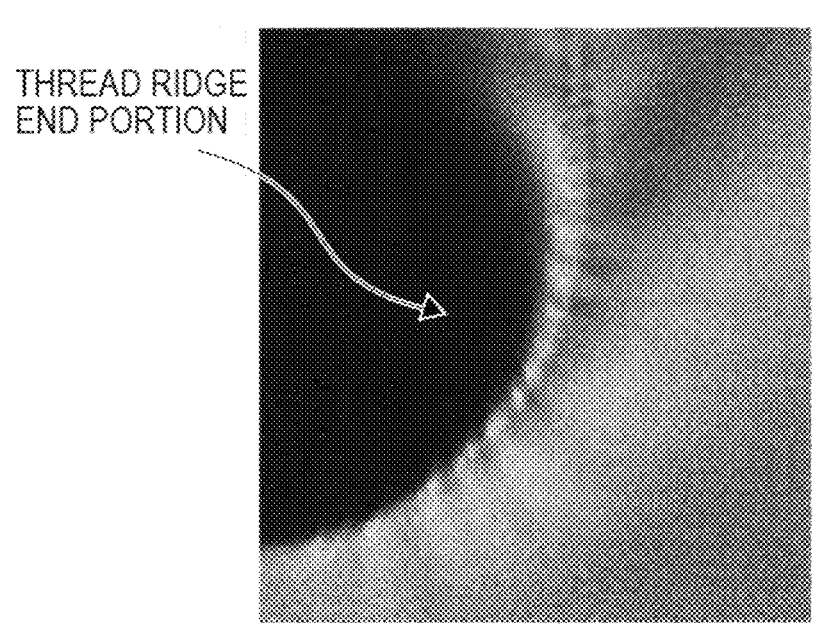
FIG. 7D is an enlarged view of an enlarged portion of FIG. 7A.

FIG. 7A to FIG. 7D are views illustrating one example of the second captured image captured by the second image-capturing step S4. FIG. 7A is an enlarged view of the vicinity of the flank face P3 (the hook-like flank face P3h) of the second captured image. FIG. 7B is an enlarged view of the flank face (the hook-like flank face P3h) that is further enlarged of the enlarged view illustrated in FIG. 7A. FIG. 7C is an enlarged view of the thread bottom end portion P4 that is further enlarged of the enlarged view illustrated in FIG. 7A. FIG. 7D is an enlarged view of a thread ridge end portion (a portion where the flank face P3 intersects with the top face P11 of the thread ridge P1) that is further enlarged of the enlarged view illustrated in FIG. 7A.

As illustrated in FIG. 7A to 7D, in the second captured image, a shading pattern (see the region enclosed by a dotted line D illustrated in FIG. 7A) such as interference fringes is generated in the pixel region corresponding to the flank face P3 and the thread bottom end portion P4 (and further, the thread ridge end portion). In the meantime, no shape, color, or texture that reflects such a shading pattern can be found on the actual surface of the thread even when observed by a conventional well-known observation method. Since the shading pattern is generated in the second captured image as above, as will be described later, the arithmetic operation unit 4 performs the image processing on the second captured image, to thereby calculate the focusing measure of the pixels that constitute the second captured image, and based on the calculated focusing measure, the outlines of the flank face P3 and the thread bottom end portion P4 can be calculated.

Next, there will be explained the reason why the above-described shading pattern such as interference fringes is generated, which is considered by the present inventors, with reference to FIG. 8A and FIG. 8B.

Figure 8A:
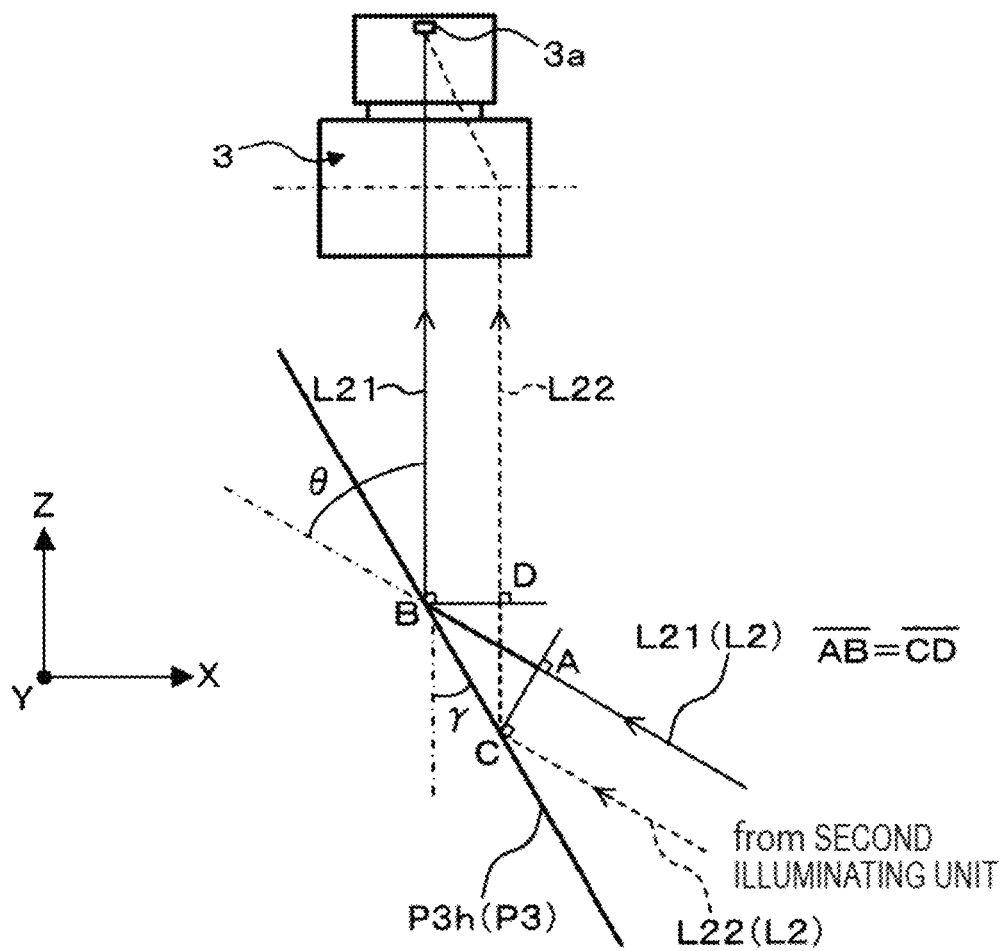
FIG. 8A is a view for explaining the reason why a shading pattern is generated in the second captured image.
Figure 8B:
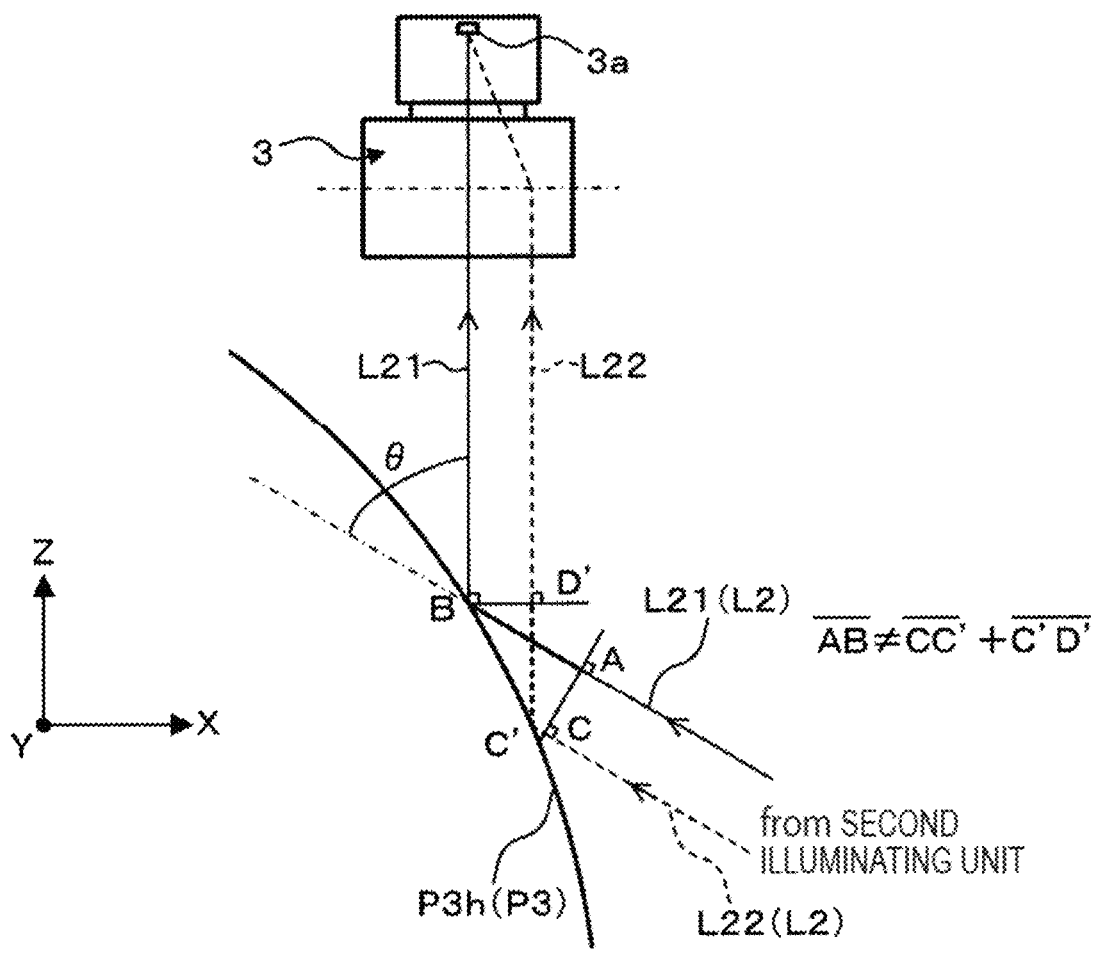
FIG. 8B is a view for explaining the reason why the shading pattern is generated in the second captured image.

FIG. 8A and FIG. 8B are views schematically explaining the reason why the shading pattern such as interference fringes is generated in the second captured image (views viewed from the Y direction). As illustrated in FIG. 8A and FIG. 8B, there will be considered the case where out of the parallel lights L2 emitted from the second illuminating unit 2, a parallel light L21 and a parallel light L22 (parallel lights present therebetween) are reflected on the flank face P3 (the hook-like flank face P3h) and an image of the reflected parallel lights is formed by an image sensor 3a of the image-capturing unit 3. As described previously, since the second illuminating unit 2 has the optical axis in a direction forming the angle θ larger than the lead angle γ of the thread portion with respect to the Z direction, the parallel light L21 and the parallel light L22 reach the flank face P3 to be reflected on the flank face P3 incidentally, in FIG. 8A and FIG. 8B, for the convenience of explanation, the lead angle γ and the angle θ are illustrated to be larger than the actual angles.

As illustrated in FIG. 8A, if the flank face P3 is a straight line viewed from the Y direction, there is no optical path difference between the parallel light L21 and the parallel light L22 because the length of a line segment AB in the optical path of the parallel light. L21 is equal to the length of a line segment CD in the optical path of the parallel light L22. There is also no optical path difference with respect to the parallel lights L2 present between the parallel light L21 and the parallel light L22 (parallel lights illuminating a line segment BC of the flank face P3) similarly. Further, there is also no optical path difference with respect to the parallel lights L2 illuminating the portion other than the line segment BC of the flank face P3 (parallel lights whose images are formed by image sensors other than the image sensor 3a) similarly. Accordingly, in the case illustrated in FIG. 8A, the shading pattern such as interference fringes is not generated in the pixel region corresponding to the flank face P3 in the second captured image.

However, the actual flank face P3 becomes a gentle curve viewed from the Y direction, as illustrated in FIG. 8B, due to the effect of its angle β or the lead angle γ. Therefore, the length of the line segment AB in the optical path of the parallel light L21 is different from the sum of the length of a line segment CC' and the length of a line segment C'D' in the optical path of the parallel light L22, resulting in that the optical path difference is generated between the parallel light L21 and the parallel light L22. As for this optical path difference, an optical path difference is also generated with respect to the parallel lights L2 present between the parallel light L21 and the parallel light 122 (parallel lights illuminating a curve BC' of the flank face P3) similarly. Further, an optical path difference is generated with respect to the parallel lights L2 illuminating the portion other than the curve BC' of the flank face P3 (parallel lights whose images are formed by image sensors other than the image sensor 3a) similarly. The generated optical path differences are not fixed, and thus, in the case of the actual flank face P3 illustrated in FIG. 8B, the shading pattern such as interference fringes is considered to be generated in the pixel region corresponding to the flank face P3 in the second captured image.

Next, the first outline calculating step S5 to the thread shape arithmetic operation step S7 will be explained. These steps are implemented by the arithmetic operation unit 4 executing the programs stored in the storage unit 43. The arithmetic operation unit 4 starts executing the program in response to an instruction to start the measurement from the measurer.

[First Outline Calculating Step S5]

In the first outline calculating step S5, the first captured-image acquisition unit 45 in the arithmetic operation unit 4 acquires the first captured image captured by the image-capturing unit 3 in the first image-capturing step S2 from the image-capturing unit 3 through the communication unit 44. For example, the first captured-image acquisition unit 45 processes, as the first captured image, the captured image first acquired since the measurement starts (the execution of the program starts). Then, the first outline calculating unit 47 in the arithmetic operation unit 4 performs image processing on the first captured image, to thereby calculate the first outline being a partial outline of the thread portion along the axial direction of the thread axis A in the cross section M. For example, the first outline calculating unit 47 binarizes the first captured image with a predetermined threshold value, to thereby extract a bright pixel region (a pixel region not blocked by the thread portion), or performs image processing to extract a dark pixel region (a pixel region blocked by the thread portion), and detects edges of the extracted pixel region, to thereby calculate the first outline. Incidentally, extracting a pixel region is not limited to the case of actually extracting a pixel region, and means that it also includes processing of separating a pixel region from the first captured image.

Here, the first outline includes the top face P11 of the thread ridge P1 and the bottom face P21 of the thread groove P2, but does not include the flank face P3 or the thread bottom end portion P4. The first outline calculating unit 47 stores the calculated first outline in the storage unit 43 in association with identification information indicating that it is the first outline. Incidentally, the first outline calculating unit 47 may display the first captured image and the calculated first outline on the display unit 42 so as to enable the measurer to check them.

[Second Outline Calculating Step S6]

In the second outline calculating step S6, the second captured-image acquisition unit 46 in the arithmetic operation unit 4 acquires the second captured image captured by the image-capturing unit 3 in the second image-capturing step S4 from the image-capturing unit 3 through the communication unit 44. For example, the second captured-image acquisition unit 46 processes, as the second captured image, the captured image acquired second since the measurement starts (the execution of the program starts). Then, the second outline calculating unit 48 in the arithmetic operation unit 4 performs image processing on the second captured image, to thereby calculate the second outline being a partial outline of the thread portion along the axial direction of the thread axis A in the cross section M. For example, the second outline calculating unit 48 calculates a focusing measure of pixels constituting the second captured image, and based on the calculated focusing measure, calculates the second outline. More concretely, the second outline calculating unit 48 calculates the second outline based on barycentric positions in the X direction and the Y direction of the calculated focusing measure. Here, the second outline includes the flank face P3 and the thread bottom end portion P4. The second outline calculating unit 48 stores the calculated second outline in the storage unit 43 in association with identification information indicating that it is the second outline. Incidentally, the second outline calculating unit 48 may display the second captured image and the calculated second outline on the display unit 42 so as to enable the measurer to check them.

As the focusing measure, for example, a contrast or an image density deviation between surrounding pixels can be used. In this embodiment, as the focusing measure, the image density deviation between surrounding pixels (to be referred to as an "inter-pixel image density deviation" below) is used. Here, the image density means a pixel value. The second outline calculating unit 48 calculates the pixel with a high inter-pixel image density deviation out of the pixels constituting the second captured image as the second outline.

Concretely, an image density of each pixel constituting the second captured image is set to $I(x, y)$, and an inter-pixel image density deviation of each pixel is set to $ML(x, y)$. The inter-pixel image density deviation $ML(x, y)$ is expressed by the following equation (1) using the image density of each pixel and the image density of four surrounding pixels, for example. Incidentally, x means an X coordinate of each pixel in the second captured image (see FIG. 7A) expressed on an XY plane. Further, y means a Y coordinate of each pixel in the second captured image expressed on the XY plane. Incidentally, (x, y) may be considered as a vector representing positions on a two-dimensional plane of a two-dimensional image sensor, such as a CCD or CMOS, used as the image sensor of the image-capturing unit 3 in a pixel unit.

[Mathematical equation 1]

$$ML(x, y) = |2I(x, y) - I(x - p, y) - I(x + p, y)| + \\ |2I(x, y) - I(x, y - p) - I(x, y + p)| \quad (1)$$

Alternatively, the inter-pixel image density deviation $ML(x, y)$ is expressed by the following equation (2) using the image density of each pixel and the image density of eight surrounding pixels.

[Mathematical equation 2]

$$ML(x, y) = |2I(x, y) - I(x - p, y) - I(x + p, y)| + \\ |2I(x, y) - I(x, y - p) - I(x, y + p)| + \\ |2I(x, y) - I(x - p, y - p) - I(x + p, y + p)| + \\ |2I(x, y) - I(x - p, y + p) - I(x + p, y - p)| \quad (2)$$

Incidentally, p in the equation (1) and the equation (2) is an arbitrary natural number, and, for example, p=2 is established.

Figure 9:
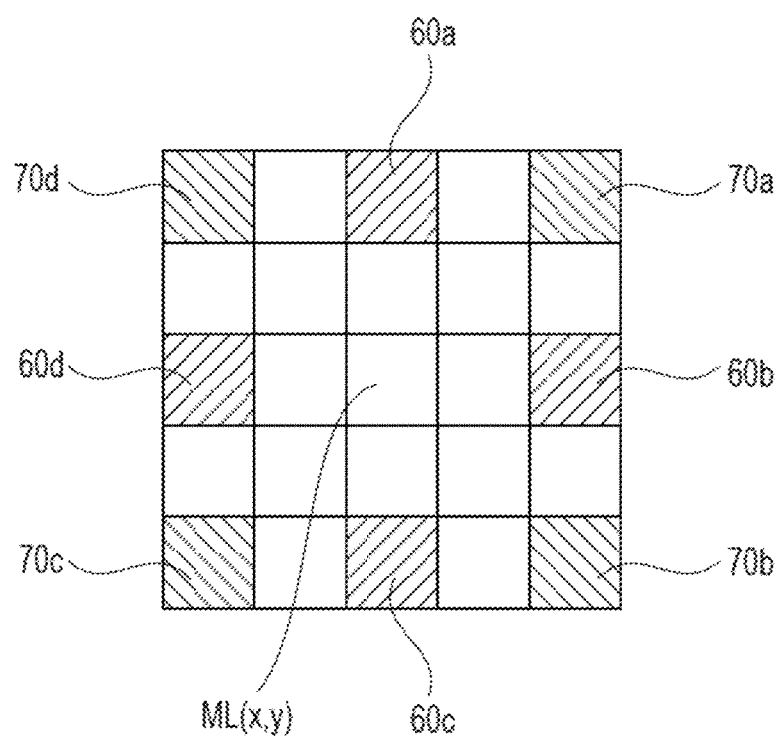
FIG. 9 is a view for explaining a method of calculating an inter-pixel image density deviation.

FIG. 9 is a view for explaining a method of calculating the inter-pixel image density deviation $ML(x, y)$. Here, the case of calculating the inter-pixel image density deviation $ML(x, y)$ of the center pixel of 5×5 pixels is assumed.

In the case where P=2 is set and the inter-pixel image density deviation $ML(x, y)$ of the center pixel is calculated by the equation (1), the inter-pixel image density deviation $ML(x, y)$ is calculated based on the image density $I(x, y)$ of the center pixel and the image density of four pixel 60a to pixel 60d.

Further, in the case where P=2 is set and the inter-pixel image density deviation $ML(x, y)$ of the center pixel is calculated by the equation (2), the inter-pixel image density deviation $ML(x, y)$ is calculated based on the image density $I(x, y)$ of the center pixel, the image density of the four pixel 60a to pixel 60d, and the image density of four pixel 70a to pixel 70d.

Further, the inter-pixel image density deviation $ML(x, y)$ may be calculated for all the pixels constituting the second captured image, or may be calculated only for the pixels at the position and in the range of the pixel region corresponding to the flank face P3 and the thread bottom end portion P4 in the second captured image. Concretely, the estimating unit 50 in the arithmetic operation unit 4 estimates the range where the second outline is located, concretely, the range of the pixel region including the flank face P3 and the thread bottom end portion P4, from the first captured image acquired by the first captured-image acquisition unit 45 or the first outline calculated by the first outline calculating unit 47. For example, the estimating unit 50 estimates, as the range of the pixel region including the flank face P3 and the thread bottom end portion P4, the range that is away from a virtual line connecting, of the first outline, the end portion of the top face P11 of the thread ridge P1 and the end portion of the bottom face P21 of the thread groove P2 to each of the pipe end face side in the x direction and the side opposite thereto by a predetermined distance. As the predetermined distance, for example, a distance of ⅛ to 1/16 of the interval in the X direction where the end portion, of the thread ridge, of the first outline on the pipe end face side appears, or the like can be used. Further, the estimating unit 50 may read design drawing data of the thread portion stored in the storage unit 43 to estimate the range of the pixel region including the flank face P3 and the thread bottom end portion P4 based on the design drawing data. For example, the estimating unit 50 moves the drawing data parallel to the first captured image relatively so as to make the drawing data substantially agree with the first outline. Then, the estimating unit 50 estimates the region of the first captured image corresponding to a peripheral region including the flank face and the thread bottom end portion on screen data as the range of the pixel region including the flank face P3 and the thread bottom end portion P4. The second outline calculating unit 48 can accelerate the processing speed by calculating the inter-pixel image density deviation ML(x, y) only for the pixels within the range of the pixel region estimated by the estimating unit 50.

After calculating the inter-pixel image density deviation ML(x, y) of all the pixels (or the pixels within the estimated range of the pixel region), the second outline calculating unit 48 calculates an average value FM(x, y) of the inter-pixel image density deviations ML(x, y) of surrounding (2N+1)× (2M+1) pixels of each pixel, for example. This average value FM(x, y) of the inter-pixel image density deviations can be used as the focusing measure of each pixel. N and M are arbitrary natural numbers and N=M=2, for example, is established. Incidentally, the second outline calculating unit 48 may change the value of N, M according to an image, or may use the value of N, M obtained by searching for the value of N, M from which a focusing measure of a predetermined value or more is calculated.

Here, concretely, in the case where N=M=2 is established and the average value FM(x, y) of the center pixel of the 5×5 pixels illustrated in FIG. 9 is calculated, the inter-pixel image density deviations ML of 25 pixels are added to be divided by 25, to thereby calculate the average value FM(x, y) of the center pixel. In the same manner, the average value FM(x, y) of all the pixels (or the pixels within the estimated range of the pixel region) is calculated.

Incidentally, in the case of using the contrast in place of the inter-pixel image density deviation, the second outline calculating unit 48 only needs to use values expressed as $(I_{max}-I_{min})/(I_{max}+I_{min})$ and $I_{max}/I_{min}$ for calculating the focusing measure when in a local pixel region, the maximum image density is set to $I_{max}$ and the minimum image density is set to $I_{min}$.

Further, the second outline calculating unit 48 may use the value obtained by dividing the inter-pixel image density deviation ML(x, y) expressed by the equation (1) by the average value of the image density of each pixel and the image density of the four surrounding pixels for calculating the focusing measure. Further, the second outline calculating unit 48 may use the value obtained by dividing the inter-pixel image density deviation ML(x, y) expressed by the equation (2) by the average value of the image density of each pixel and the image density of the eight surrounding pixels for calculating the focusing measure.

Finally, the second outline calculating unit 48 calculates, of the focusing measure FM(x, y), the barycentric position in the X direction and the barycentric position in the Y direction, for example, thereby making it possible to calculate the barycentric positions as the second outline. Concretely, a barycentric position Xg in the X direction is expressed by the following equation (3) and a barycentric position Yg in the Y direction is expressed by the following (4) direction. Either the equation (3) or the equation (4) can be used for calculating the second outline.

The second outline calculating unit 48 determines a standard and a calculation range of pixels in the X direction at a specific Y coordinate. For example, the pixel with the maximum value of the focusing measure out of the pixels in the X direction is determined as the standard, and a predetermined range along the X direction from the standard pixel (for example, ±20 pixels) is determined as the calculation range. Then, the second outline calculating unit 48 uses the equation (3) to calculate the barycentric position Xg in the X direction within the calculation range. The second outline calculating unit 48 repeatedly performs the processing to calculate the barycentric position Xg in the X direction for each change in the specific Y coordinate within the range where the focusing measure is calculated in the same manner, and then connects the calculated barycentric positions Xg to calculate the second outline.

Further, the second outline calculating unit 48 determines a standard and a calculation range of pixels in the Y direction at a specific X coordinate. For example, the pixel with the maximum value of the focusing measure out of the pixels in the Y direction is determined as the standard, and a predetermined range along the Y direction from the standard pixel (for example, ±30 pixels) is determined as the calculation range. Then, the second outline calculating unit 48 uses the equation (4) to calculate the barycentric position Yg in the Y direction within the calculation range. The second outline calculating unit 48 repeatedly performs the processing to calculate the barycentric position Yg in the Y direction for each change in the specific X coordinate within the range where the focusing measure is calculated in the same manner, and then connects the calculated barycentric positions Yg to calculate the second outline.

[Mathematical equation 3]

$$Xg = \frac{\sum FM(x, y) \times x}{\sum FM(x, y)} \quad (3)$$

$$Yg = \frac{\sum FM(x, y) \times y}{\sum FM(x, y)} \quad (4)$$

Figure 10:
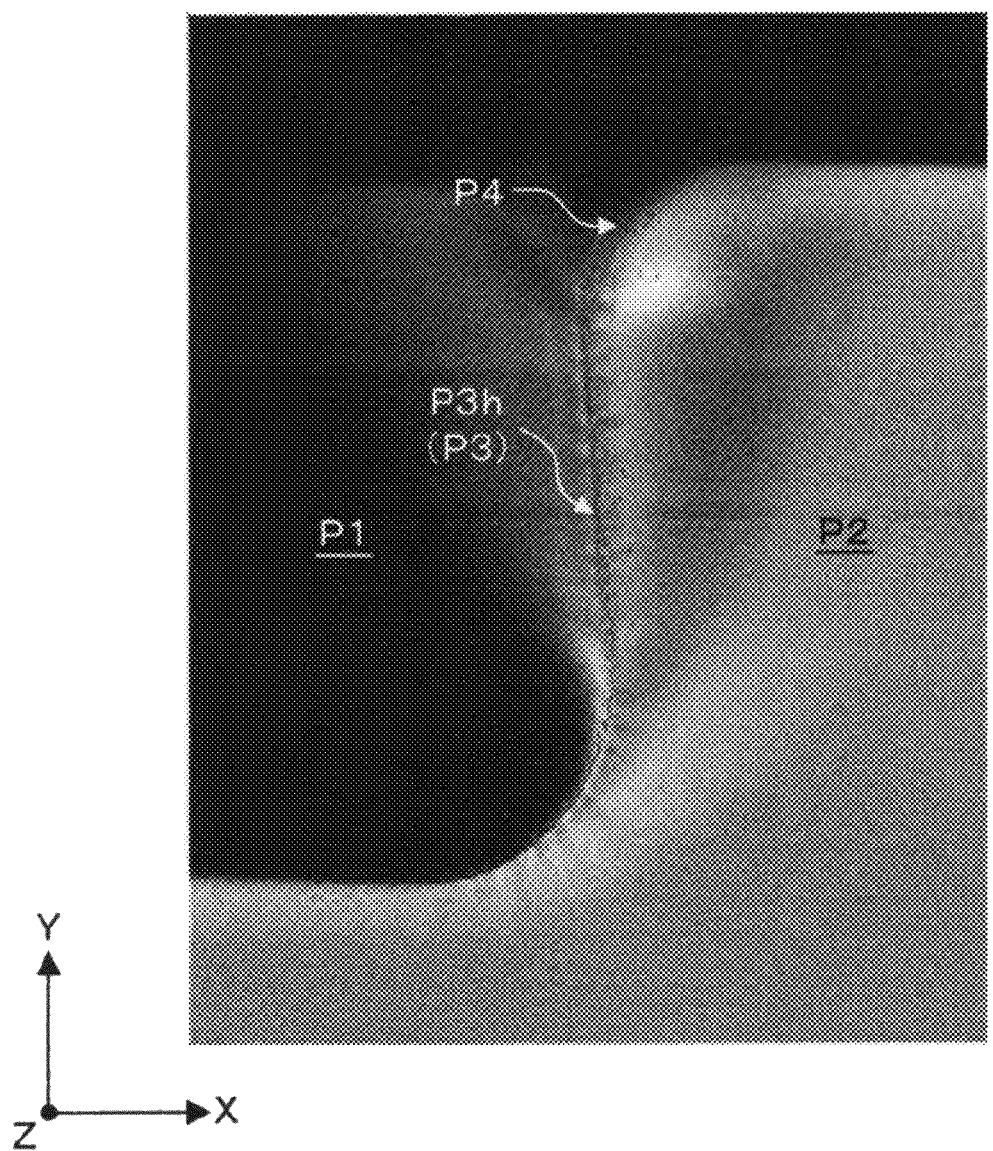
FIG. 10 is a view in which barycentric positions of a focusing measure are superimposed on the second captured image.

FIG. 10 is a view where the calculated barycentric positions of the focusing measure FM(x, y) are superimposed on the previously described second captured image illustrated in FIG. 7A. As illustrated in FIG. 10, it is found out that the outline of the flank face P3 and the thread bottom end portion P4 have been calculated accurately.

Incidentally, the method of calculating the second outline is not limited to the above-described method. For example, the second outline calculating unit 48 calculates a focusing measure distribution in which the horizon axis is the pixel direction axis and the vertical axis is the Focusing measure. Then, the second outline calculating unit 48 may find an approximate curve of this focusing measure distribution (a curve having a convex upward) to employ the vertex of this approximate curve as a point that constitutes the second outline (what is called sub-pixel processing).

[Thread Shape Arithmetic Operation Step S7]

In the thread shape arithmetic operation step S7, the thread shape arithmetic operation unit 49 in the arithmetic operation unit 4 arithmetically operates the thread shape of the thread portion based on the first outline calculated by the first outline calculating step S5 and the second outline calculated by the second outline calculating step S6.

Concretely, the thread shape arithmetic operation unit 49 can arithmetically operate, based on the first outline, the phase of the thread ridge P1 corresponding to the position of the thread ridge P1 in the axial direction of the thread axis A, the thread diameter being the outside diameter of the thread ridge P1 from the pipe end face to a predetermined position in the axial direction of the thread axis A, the diameter of the bottom face P21 of the thread groove P2 along the axial direction of the thread axis A, a taper shape being a change in the diameter, and so on.

Further, for example, the thread shape arithmetic operation unit 49 can arithmetically operate the angle of the flank face P3 and the curvature radius of the thread bottom end portion P4 based on the second outline.

As above, the thread shape arithmetic operation unit 49 arithmetically operates the thread shape of the thread portion, and thereby the thread shape is measured. The thread shape arithmetic operation unit 49 may display treasured values of the thread portion on the display unit 42 or may store them in the storage unit 43.

Figure 11:
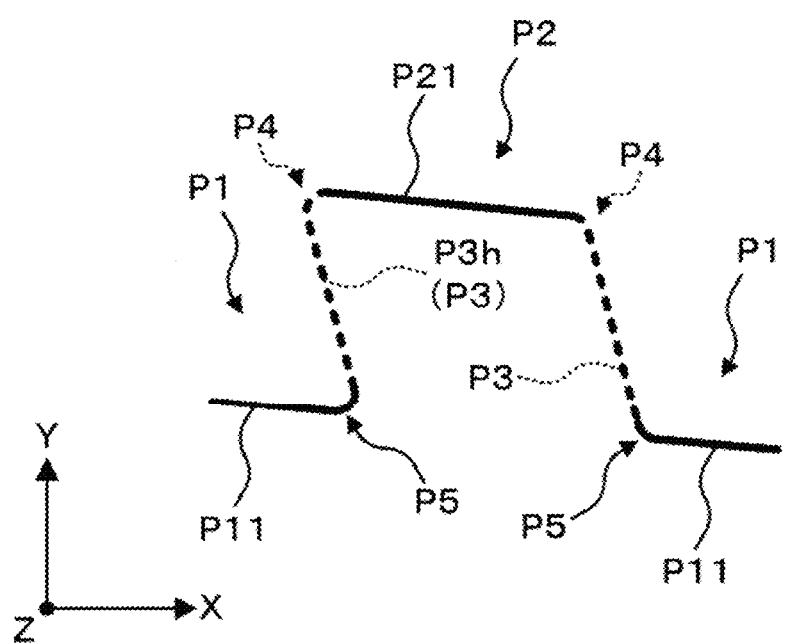
FIG. 11 is a view illustrating one example of a combined outline of a first outline and a second outline.

Further, the thread shape arithmetic operation unit 49 can calculate such a combined outline obtained by combining the first outline and the second outline as illustrated in FIG. 11. The outline illustrated by a solid line in FIG. 11 is the first outline, and the outline illustrated by a dotted line in FIG. 11 is the second outline. Since the first captured image used for calculating the first outline and the second captured image used for calculating the second outline are captured by using the common image-capturing unit 3, the first outline and the second outline can be combined easily.

The thread shape arithmetic operation unit 49 can arithmetically operate the width of the thread ridge and the width of the thread valley based on the calculated combined outline.

The thread shape arithmetic operation unit 49 may display the calculated combined outline on the display unit 42, or may store it in the storage unit 43. At this time, as illustrated in FIG. 11, the thread shape arithmetic operation unit 49 preferably displays the first outline and the second outline so that they can be distinguished by changing the type of line, the thickness of line, the color of line, or the like, for example.

As above, according to the thread shape measuring apparatus 100 and the measuring method according to this embodiment, it is possible to measure the thread shape that can be measured by a conventional silhouette method by using the first captured image, and measure the thread shapes that are difficult to be measured by a conventional silhouette method, a method using a contact probe, or a laser rangefinder of a triangulation method by using the second captured image.

Next, there will be explained one example of results obtained by measuring the thread shape of the same threaded pipe (oil well pipe) by the thread shape measuring method according to this embodiment and a contact-type thread shape measuring method.

As the contact-type thread shape measuring method, there was used a stylus-type measuring method using a Contracer manufactured by Mitutoyo Corporation (a tip angle of 20° and a tip radius of 25 µm of a stylus).

Figure 12:
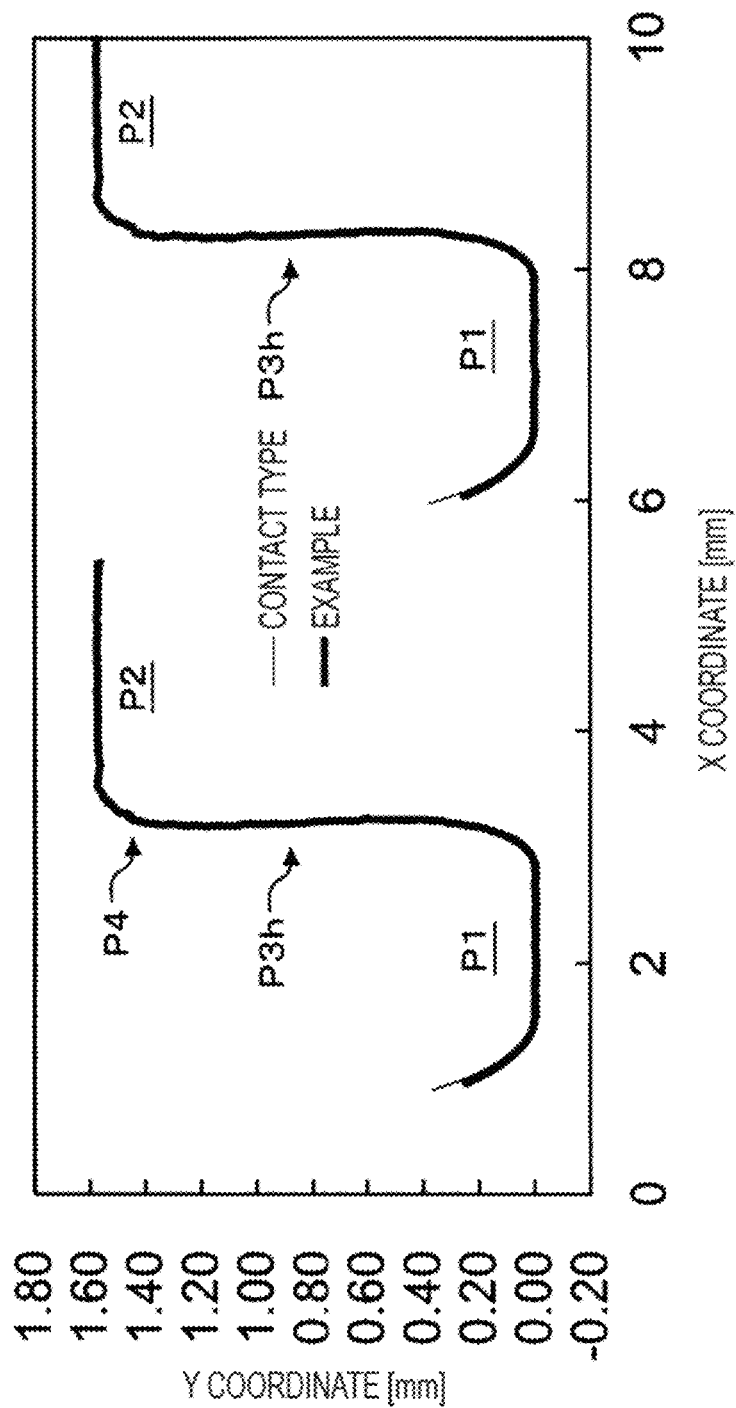
FIG. 12 is a view illustrating results obtained by measuring a thread shape by a measuring method in this example and measuring a thread shape by a contact-type measuring method.

FIG. 12 is a view illustrating results obtained by measuring a cycle from the thread ridge P1 to the thread groove P2 of the thread portion of the same threaded pipe for about two cycles by the thread shape measuring method according to this embodiment and the contact-type thread shape measuring method. In FIG. 12, the result measured by the thread shape measuring method according to this embodiment (to be referred to as an "example" appropriately) is illustrated by a thick line, and the result measured by the contact-type thread shape measuring method (to be referred to as a "contact type" appropriately) is illustrated by a thin line. The same is true of FIG. 13A, FIG. 13B, and FIG. 14 that will be described later. As is clear from FIG. 12, the measurement result in the example and the measurement result in the contact type almost overlap with each other.

Figure 13A:
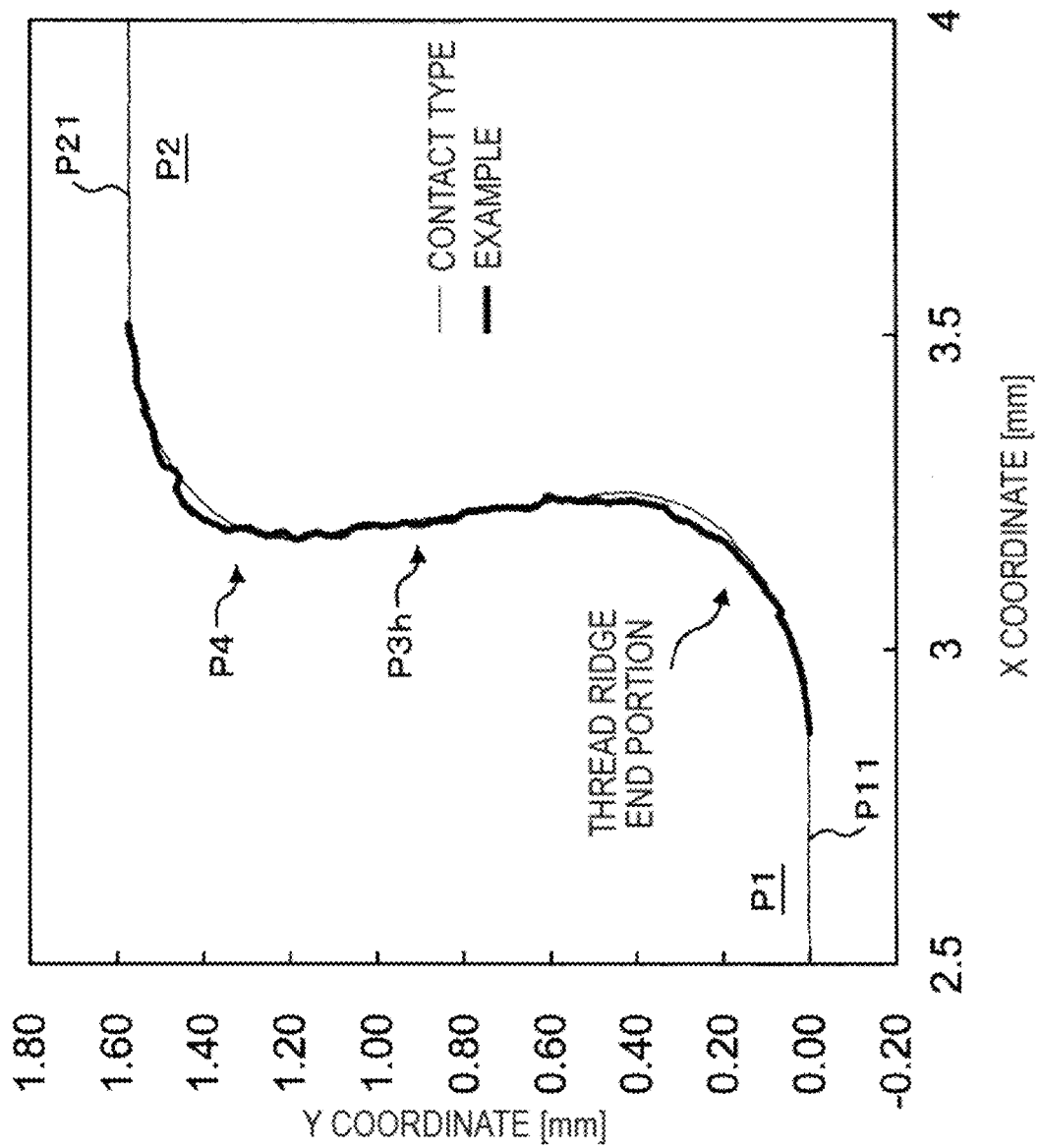
FIG. 13A is a view illustrating an enlarged view of the vicinity of a hook-like flank face P3h out of the measurement results illustrated in FIG. 12.
Figure 13B:
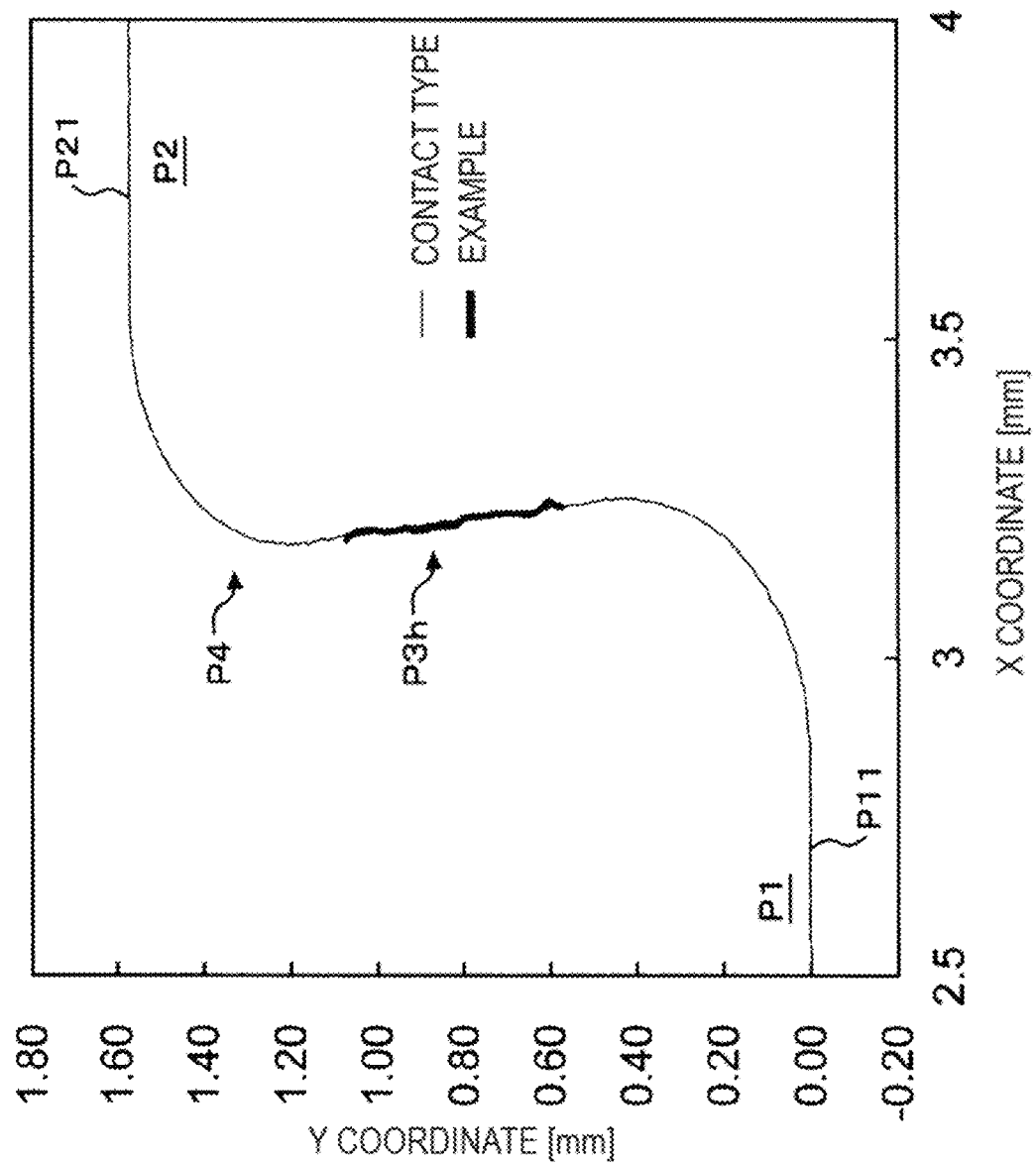
FIG. 13B is a view illustrating an enlarged view of the vicinity of the hook-like flank face P3h out of the measurement results illustrated in FIG. 12.

FIG. 13A and FIG. 13B illustrate an enlarged view of the vicinity of the hook-like flank face P3h of the measurement result illustrated in FIG. 12. FIG. 13A is an enlarged view of the vicinity of the hook-like flank face P3h. FIG. 132 is a view illustrating the result obtained by extracting the measurement result of the portion corresponding to the hook-like flank face P3h in the measurement result in the example from the measurement result illustrated in FIG. 13A.

In the measurement result in the example illustrated in FIG. 13A, of the measurement result in the example illustrated in FIG. 12, the top face P11 of thread ridge P1 and the bottom face P21 of thread groove P2 are approximated by a straight line in substantially the X direction from the respective measurement results, and the portions corresponding to these approximate straight lines are excluded from the measurement result in the example illustrated in FIG. 12. Further, in the measurement result in the example illustrated in FIG. 13B, of the measurement result in the example illustrated in FIG. 13A, the thread bottom end portion P4 and the thread ridge end portion are approximated by a circle from the respective measurement results, and the portions corresponding to these approximate circles are excluded from the measurement result in the example illustrated in FIG. 13A.

The hook-like flank face P3h in the example extracted as illustrated in FIG. 13B was approximated by a straight line, the hook-like flank face P3h in the contact type extracted similarly was approximated by a straight line, and a comparison in an inclination of the approximate straight line of the hook-like flank face P3h (an angle formed between the bottom face P21 of the thread groove P2 and the approximate straight line) was made between the measurement result in the example and the measurement result in the contact type. As for the inclination of the approximate straight line of the hook-like flank face P3h in the example illustrated on the left in FIG. 12, an average value of the inclinations resulting from four continuous measurements was 84.71° (a standard deviation was 0.024°), and the inclination of the approximate straight line of the hook-like flank face P3h in the contact type was 84.44°. The deviation between the both was −0.27° Further, the deviation between the inclination of the approximate straight line of the hook-like flank face P3h in the example illustrated on the right in FIG. 12 (the average value of the inclinations resulting from four continuous measurements) and the inclination of the approximate straight line of the hook-like flank face P3h in the contact type was 0.15° similarly. A standard deviation of the four measurements was 0.018°. That is, the measurement result of the hook-like flank face P3h in the example and the measurement result of the hook-like flank face P3h in the contact type were in good agreement with each other.

Figure 14:
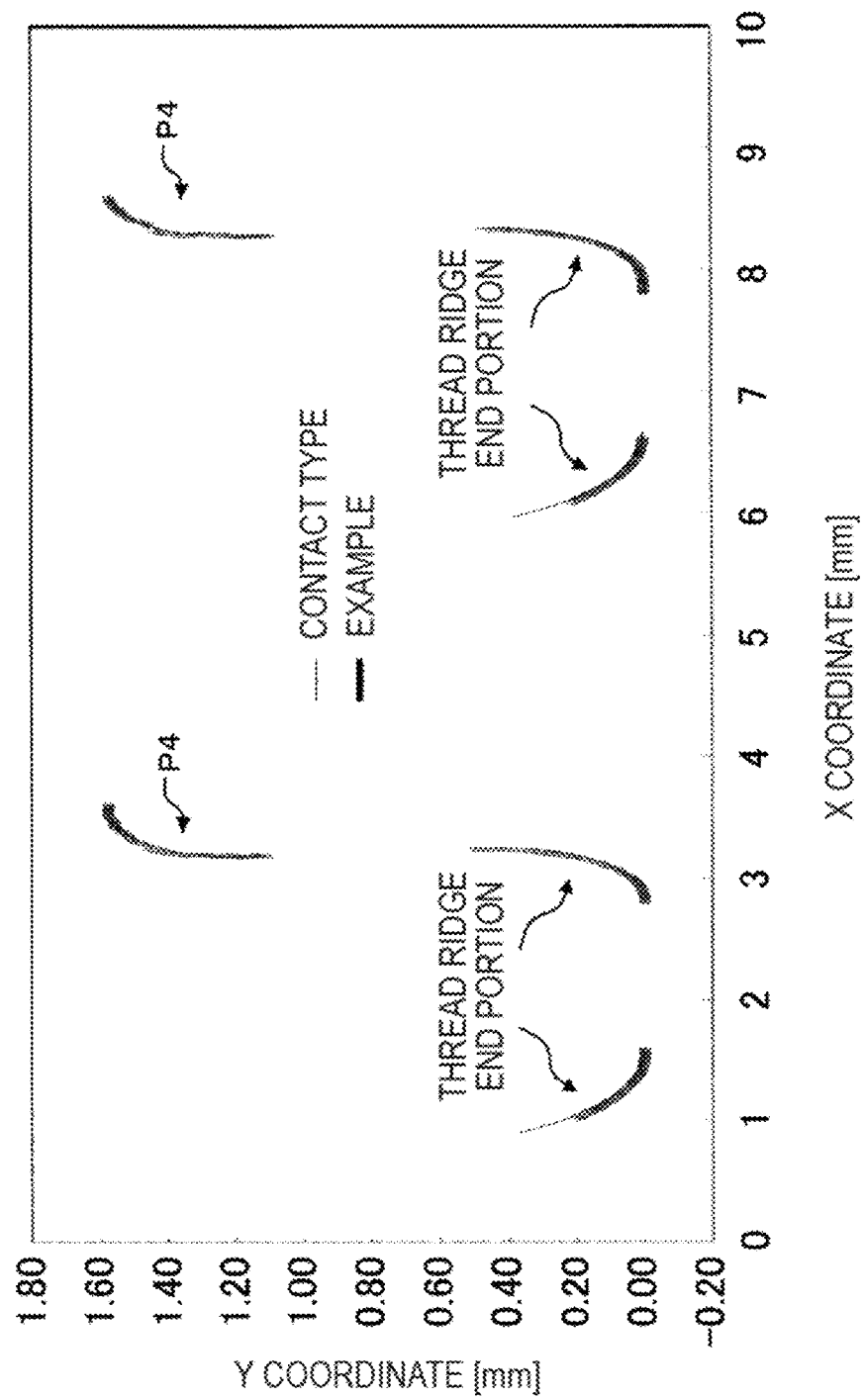
FIG. 14 is a view illustrating the measurement results of portions corresponding to a thread bottom end portion P4 and a thread ridge end portion out of the measurement results illustrated in FIG. 12.

FIG. 14 is a view illustrating results obtained by extracting the measurement result of the portions corresponding to the thread bottom end portion P4 and the thread ridge end portion from the measurement result illustrated in FIG. 12.

As for a curvature radius of an approximate circle of the thread bottom end portion P4 in the example illustrated on the left in FIG. 14, an average value of the curvature radii resulting from four continuous measurements was 0.327 mm (a standard deviation was 0.00096 mm), and a curvature radius of an approximate circle of the thread bottom end portion P4 in the contact type was 0.362 mm. The deviation between the both was 0.035 mm. Further, as for a curvature radius of an approximate circle of the thread bottom end portion P4 in the example illustrated on the right in FIG. 14, an average value of the curvature radii resulting from four continuous measurements was 0.339 mm (a standard deviation was 0.00052 mm), and a curvature radius of an approximate circle of the thread bottom end portion P4 in the contact type was 0.368 mm. The deviation between the both was 0.029 mm. That is, the measurement result of the thread bottom end portion P4 in the example and the measurement result of the thread bottom end portion P4 in the contact type were in good agreement with each other. The same was true of the thread ridge end portion.

INDUSTRIAL APPLICABILITY

The present invention can be used when measuring a thread shape of a thread portion.

The invention claimed is:

1. A thread shape measuring apparatus, comprising:
a first illuminating unit that has an optical axis in a direction orthogonal to a cross section including a thread axis of a thread portion of an object and emits parallel light to illuminate the thread portion;
a second illuminating unit that has an optical axis in a direction forming an angle larger than a lead angle of the thread portion with respect to the direction orthogonal to the cross section and emits parallel lights to illuminate the thread portion;
an image-capturing unit that has a visual axis parallel to the optical axis of the first illuminating unit, includes a telecentric lens, has a focusing position matching the cross section, and detects, out of the parallel lights emitted from the first illuminating unit and the second illuminating unit, the light that has not been blocked by the thread portion to capture an image of the detected light; and
an arithmetic operation unit that arithmetically operates a thread shape of the thread portion based on a captured image captured by the image-capturing unit, wherein the arithmetic operation unit
performs image processing on a first captured image captured by detecting, out of the parallel lights emitted from the first illuminating unit, the light that has not been blocked by the thread portion, to thereby calculate a first outline being a partial outline of the thread portion along an axial direction of the thread axis in the cross section,
performs image processing on a second captured image captured by detecting, out of the parallel lights emitted from the second illuminating unit, the light that has not been blocked by the thread portion, to thereby calculate a second outline being a partial outline of the thread portion along the axial direction of the thread axis in the cross section, and
arithmetically calculates the thread shape of the thread portion of the object based on the first outline and the second outline that are calculated,
wherein further the arithmetic operation unit performs image processing on the second captured image, to thereby calculate a focusing measure of pixels constituting the second captured image, and based on the calculated focusing measure, calculates the second outline.

2. The thread shape measuring apparatus according to claim 1, wherein
the arithmetic operation unit calculates the second outline based on barycentric positions in the X direction and the Y direction of the focusing measure.

3. The thread shape measuring apparatus according to claim 1, wherein
the arithmetic operation unit estimates, in the second captured image, a range where the second outline is located and calculates the focusing measure of pixels in the estimated range.

4. The thread shape measuring apparatus according to claim 1, wherein
the arithmetic operation unit calculates the second outline including outlines of a flank face of the thread portion and a thread bottom end portion of the thread portion.

5. The thread shape measuring apparatus according to claim 1, wherein
the thread portion is a thread portion formed at an end portion of a threaded pipe.

6. A thread shape measuring method comprising:
a first illuminating step that illuminates a thread portion of an object by a first illuminating unit that emits parallel light along an optical axis in a direction orthogonal to a cross section including a thread axis of the thread portion;
a first image-capturing step that detects, out of the parallel lights emitted from the first illuminating unit, the light that has not been blocked by the thread portion to capture an image of the detected light by an image-capturing unit that has a visual axis parallel to the optical axis of the first illuminating unit, includes a telecentric lens, and has a focusing position matching the cross section;
a second illuminating step that illuminates the thread portion by a second illuminating unit that has an optical axis in a direction forming an angle larger than a lead angle of the thread portion with respect to the direction orthogonal to the cross section and emits parallel lights;
a second image-capturing step that detects, out of the parallel lights emitted from the second illuminating unit, the light that has not been blocked by the thread portion to capture an image of the detected light by the image-capturing unit;
a first outline calculating step that performs image processing on a first captured image captured by the first image-capturing step, to thereby calculate a first outline being a partial outline of the thread portion along an axial direction of the thread axis in the cross section;
a second outline calculating step that performs image processing on a second captured image captured by the second image-capturing step, to thereby calculate a second outline being a partial outline of the thread portion along the axial direction of the thread axis in the cross section;

a thread shape arithmetic operation step that arithmetically calculates a thread shape of the thread portion of the object based on the first outline calculated by the first outline calculating step and the second outline calculated by the second outline calculating step; and
further performing image processing on the second captured image, to thereby calculate a focusing measure of pixels constituting the second captured image, and based on the calculated focusing measure, calculates the second outline.

* * * * *